US012568182B2

(12) United States Patent
Agrawal et al.

(10) Patent No.: US 12,568,182 B2
(45) **Date of Patent: *Mar. 3, 2026**

(54) MINIMIZING VISUAL DISRUPTIONS WHEN TRANSITIONING FROM PRESENTING A FREEZE FRAME VIDEO TO PRESENTING A LIVE VIDEO DURING A VIDEO COMMUNICATION SESSION

(71) Applicant: MOTOROLA MOBILITY LLC, Wilmington, DE (US)

(72) Inventors: Amit Kumar Agrawal, Bangalore (IN); Bill Ryan, Libertyville, IL (US); Daniel M Vacura, Chicago, IL (US); Jeffrey S Vanhoof, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 471 days.

This patent is subject to a terminal disclaimer.

(21) Appl. No.: 18/169,841

(22) Filed: Feb. 15, 2023

(65) Prior Publication Data

US 2024/0275911 A1      Aug. 15, 2024

(51) Int. Cl.
| | |
|---|---|
| *H04N 5/272* | (2006.01) |
| *G06T 1/00* | (2006.01) |
| *G06T 7/00* | (2017.01) |
| *G06T 7/194* | (2017.01) |
| *H04N 5/14* | (2006.01) |

(52) U.S. Cl.
CPC ........... *H04N 5/272* (2013.01); *G06T 1/0007* (2013.01); *G06T 7/194* (2017.01); *G06T 7/97* (2017.01); *H04N 5/147* (2013.01); *G06T 2207/10016* (2013.01); *G06T 2207/20132* (2013.01)

(58) Field of Classification Search
None
See application file for complete search history.

(56) References Cited

U.S. PATENT DOCUMENTS

| | | | |
|---|---|---|---|
| 5,767,897 A | 6/1998 | Howell | |
| 10,554,921 B1 | 2/2020 | Lim | |
| 11,290,680 B1 * | 3/2022 | Bright-Thomas | ....... H04L 65/80 |
| 2012/0026277 A1 | 2/2012 | Malzbender | |
| 2014/0063174 A1 * | 3/2014 | Junuzovic | ........... G06Q 10/101 |
| | | | 348/E7.083 |
| 2016/0127710 A1 | 5/2016 | Saban | |
| 2021/0272467 A1 | 9/2021 | Yang | |

* cited by examiner

*Primary Examiner* — Duc Nguyen
*Assistant Examiner* — Assad Mohammed
(74) *Attorney, Agent, or Firm* — Isidore PLLC

(57) ABSTRACT

A method provides non-disruptive transition from a freeze frame video back to a live video feed from a first communication device connected via a server device to a video communication session with other participants. The method includes presenting, by the server device, a freeze frame video including an image of a participant with a background. The method includes receiving live video of a field of view of an image capturing device of the first communication device, and detecting a change in a visual characteristic of the live video that can present a visual distraction to other participants. The method includes, in response to detecting the change: modifying aspects of the live video to provide a modified live video that retains the visual characteristic consistent with the freeze frame video; and presenting the modified live video to the video communication session on transition from freeze frame video to live video.

20 Claims, 13 Drawing Sheets

LIVE VIDEO FEED

VIDEO FEED TO VCS
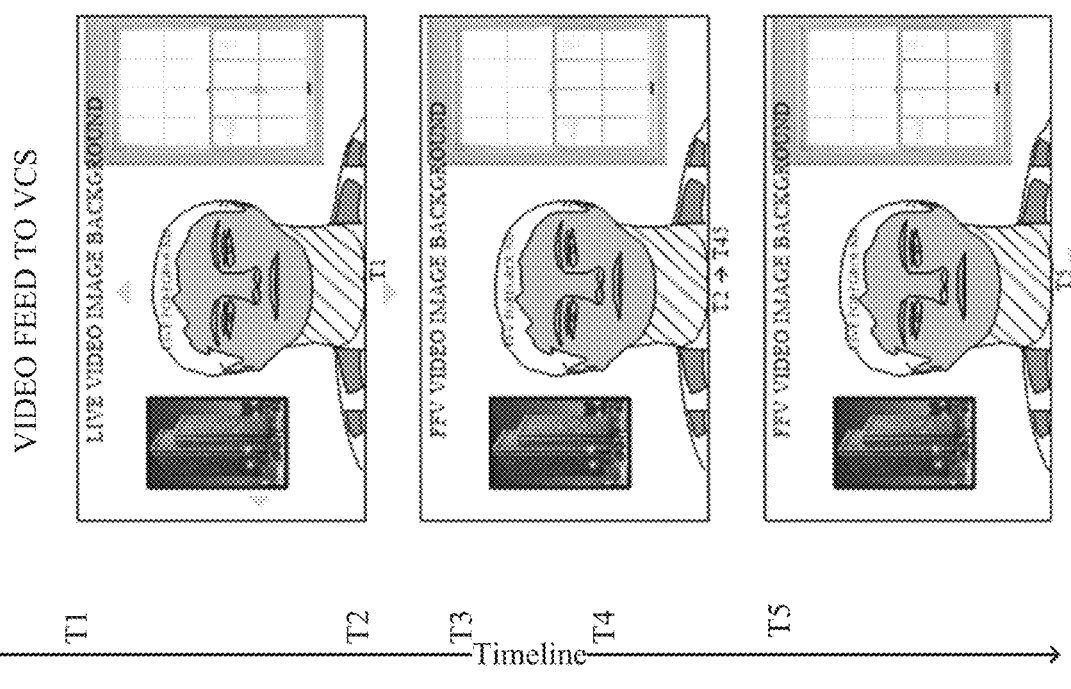
FIG. 6B
Timeline
LIVE VIDEO FEED (LOCAL ICD-CAPTURED)
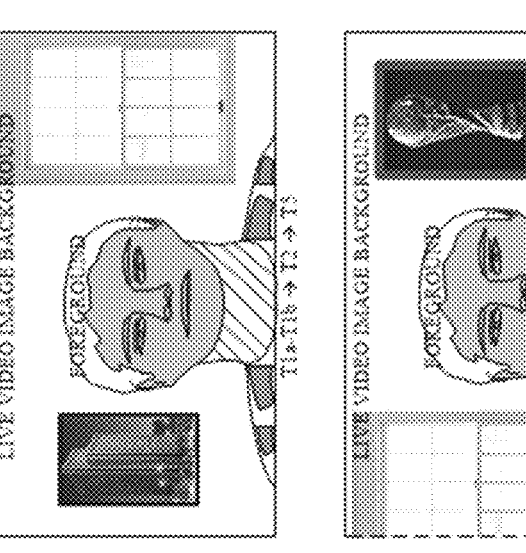
FIG. 6A

900

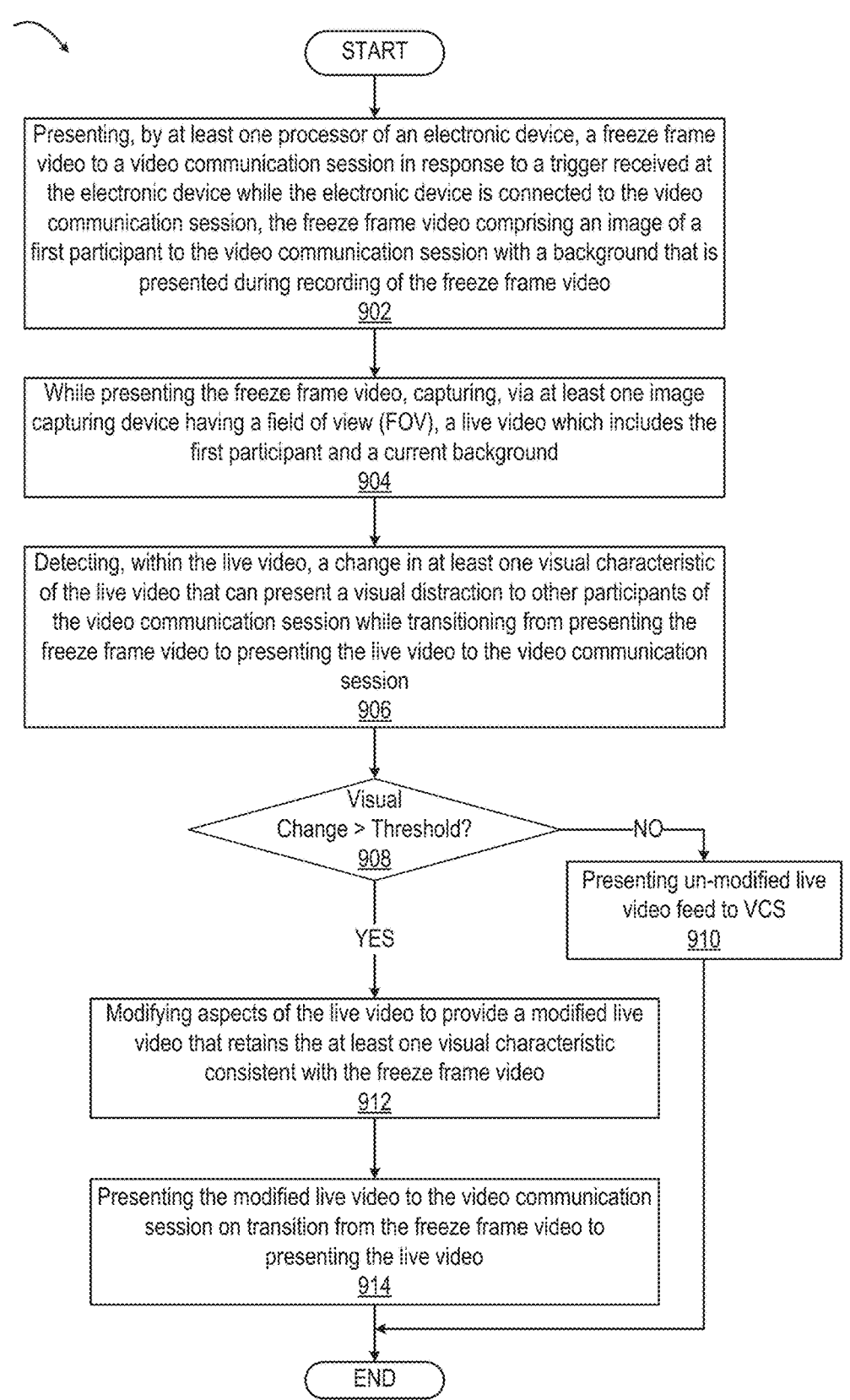

START

Presenting, by at least one processor of an electronic device, a freeze frame video to a video communication session in response to a trigger received at the electronic device while the electronic device is connected to the video communication session, the freeze frame video comprising an image of a first participant to the video communication session with a background that is presented during recording of the freeze frame video
902

While presenting the freeze frame video, capturing, via at least one image capturing device having a field of view (FOV), a live video which includes the first participant and a current background
904

Detecting, within the live video, a change in at least one visual characteristic of the live video that can present a visual distraction to other participants of the video communication session while transitioning from presenting the freeze frame video to presenting the live video to the video communication session
906

Visual Change > Threshold?
908

NO

Presenting un-modified live video feed to VCS
910

YES

Modifying aspects of the live video to provide a modified live video that retains the at least one visual characteristic consistent with the freeze frame video
912

Presenting the modified live video to the video communication session on transition from the freeze frame video to presenting the live video
914

END

FIG. 9

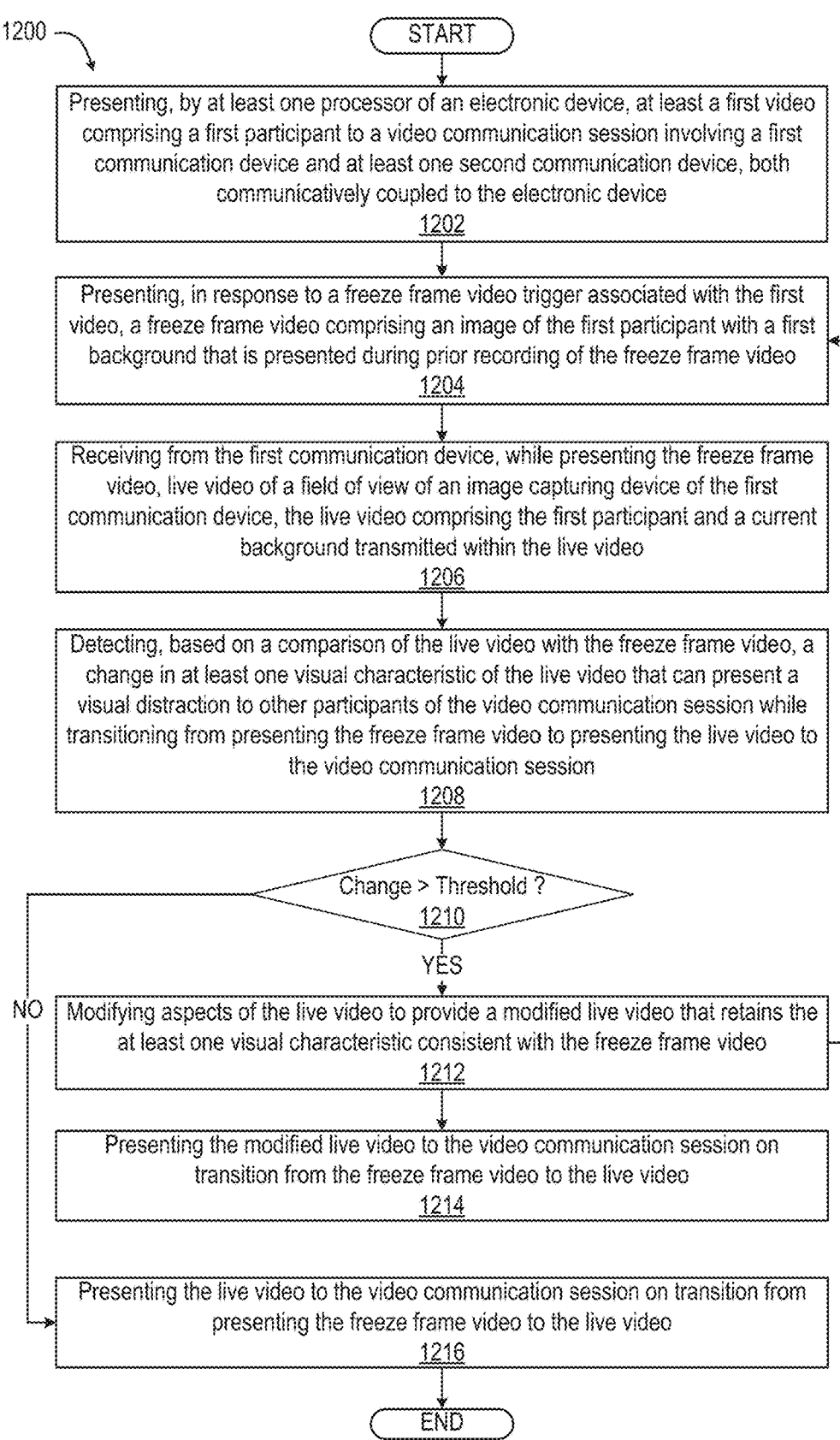

1200

START

Presenting, by at least one processor of an electronic device, at least a first video comprising a first participant to a video communication session involving a first communication device and at least one second communication device, both communicatively coupled to the electronic device
1202

Presenting, in response to a freeze frame video trigger associated with the first video, a freeze frame video comprising an image of the first participant with a first background that is presented during prior recording of the freeze frame video
1204

Receiving from the first communication device, while presenting the freeze frame video, live video of a field of view of an image capturing device of the first communication device, the live video comprising the first participant and a current background transmitted within the live video
1206

Detecting, based on a comparison of the live video with the freeze frame video, a change in at least one visual characteristic of the live video that can present a visual distraction to other participants of the video communication session while transitioning from presenting the freeze frame video to presenting the live video to the video communication session
1208

Change > Threshold ?
1210

YES

NO

Modifying aspects of the live video to provide a modified live video that retains the at least one visual characteristic consistent with the freeze frame video
1212

Presenting the modified live video to the video communication session on transition from the freeze frame video to the live video
1214

Presenting the live video to the video communication session on transition from presenting the freeze frame video to the live video
1216

END

FIG. 12

MINIMIZING VISUAL DISRUPTIONS WHEN TRANSITIONING FROM PRESENTING A FREEZE FRAME VIDEO TO PRESENTING A LIVE VIDEO DURING A VIDEO COMMUNICATION SESSION

CROSS REFERENCE TO RELATED APPLICATION

This application is related to application Ser. No. 18/169,657, having the same inventors and filed on even date herewith, the content of which is fully incorporated herein by reference.

BACKGROUND

1. Technical Field

The present disclosure generally relates to communication devices that present local participant video to a video communication session, and more specifically to communication devices that support temporary presentation of freeze frame videos.

2. Description of the Related Art

Modern smartphones are equipped with integrated digital cameras that capture high quality still pictures and videos. With these integrated cameras, smartphones are often utilized to conduct video communication sessions with one or more second devices. Most video communication applications include an option that allows the local participant to turn the local video feed on or off. Typically, when the local video is "on", the video captured by the smartphone's image capturing device is forwarded as a live video feed, which is transmitted to the second (receiving) devices communicatively connected to the video communication session. To address instances where a local participant desires to temporarily turn off the live video feed, without advertising to the other participants that the local participant has temporarily moved away from his/her device, or is changing locations, or is otherwise distracted (e.g., visibly not paying attention), a freeze frame video feature is provided that enables the local participant device to present a looped video segment of a recently captured video in which the local participant is presented as if the participant's device is still transmitting a live video feed. Transitioning from presenting the freeze frame video back to a live video feed can create disruptions in the video communication session when there are noticeable changes in the local scene subsequently being transmitted.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 6A-6B illustrate differences between the live video image being locally captured by the communication device and the actual video feed being transmitted to the video communication session over a period of time during which a change in the live video's background image is detected while a freeze frame video is being temporarily presented to the video communication session, according to one or more embodiments;

FIG. 9 depicts a flowchart of a method by which an communication device responds to detected visual changes in captured live video while presenting a freeze frame video to a video communication session, according to one or more embodiments;

FIG. 12 depicts a flowchart of a method by which the VCS host device generates modified live videos to prevent visual disruptions due to changes detected in the live video feed captured during presentation of a freeze frame video to a video communication session, according to one or more embodiments.

DETAILED DESCRIPTION

Figure 1:
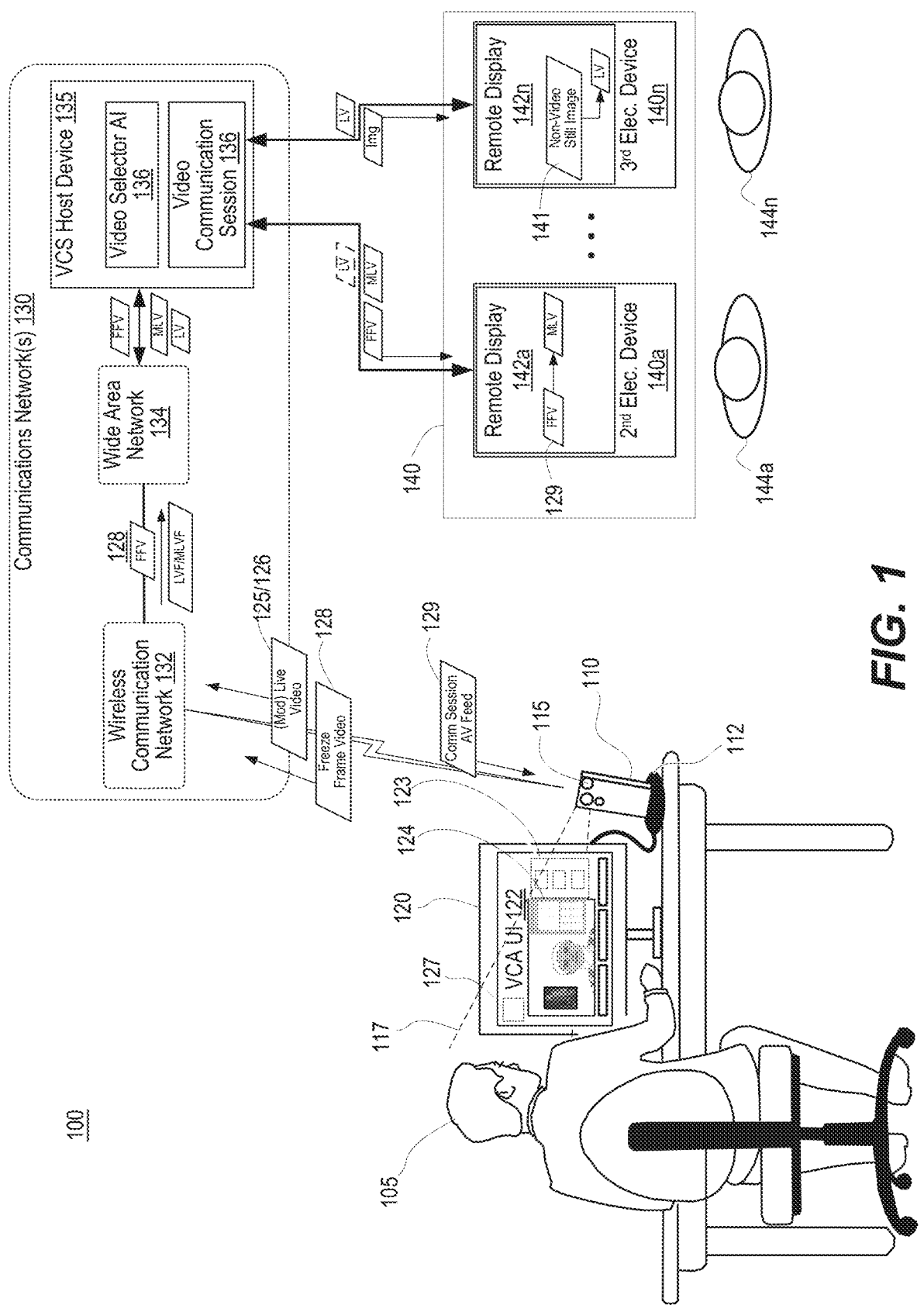
FIG. 1 illustrates an example video communication session environment in which a first communication device can transition from providing a freeze frame video to presenting a modified live video to at least one second communication device via a video communication session (VCS) hosted by a VCS host electronic device, according to one or more embodiments.

According to aspects of the disclosure, a communication device, a method, and a computer program product provides non-disruptive transition from a freeze frame video back to a live video feed for a first participant connected via the communication device to a video communication session with other participants. Specifically, the disclosure minimizes the visual disruptions that can occur based on changes in the visual characteristics of the background or foreground image within the captured live video compared with the freeze frame video being presented to the video communication session. For example, while transmitting the freeze frame video, the participant may change his physical location, his/her attire, or otherwise change his surroundings, which change becomes immediately visible when the device transitions from preventing the freeze frame video. This abrupt change becomes noticeable to the other participants and can be a distraction or cause a disruption on the video communication session. The present disclosure operates to reduce/minimizes the amount of change that is made visible to the other participants of the video communication session.

According to a first aspect, the communication device includes at least one image capturing device (ICD) that captures video and images from a field of view (FOV) of the at least one image capturing device. The communication device also includes a communication subsystem that enables the communication device to communicatively connect to at least one other second communication device via a video communication session. The communication device also includes a memory having stored thereon a video communication application and a freeze frame video (FFV) module with program code for selectively presenting a freeze frame video during the video communication session. The FFV module includes a freeze frame video transition (FFT) sub-module for responding to and minimizing visually disruptive changes detected with a live video feed captured for presentation to the video communication session during a transition from the freeze frame video back to a live video. The communication device includes at least one processor communicatively coupled to the at least one ICD, the communication subsystem, and to the memory. The at least one processor processes program instructions of the video communication application and the FFV module to configure the communication device to present a freeze frame video to the video communication session in response to a trigger received at the communication device while the communication device is connected to the video communication session, the freeze frame video including a FFV foreground image of a first participant with a FFV background image. The processor further configures the communication device to capture, via the at least one image capturing device while presenting the freeze frame video, live video of the FOV, which includes the first participant and a current live background. The communication device is further configured to detect, within the live video, a change in at least one visual characteristic of the live video that can present a visual distraction to other participants of the video communication session while transitioning from presenting the freeze frame video to presenting the live video to the video communication session. In response to detecting the change, the processor configures the communication device to modify aspects of the live video to provide a modified live video that retains the at least one visual characteristic consistent with the freeze frame video. The device presents the modified live video to the video communication session on transition from presenting the freeze frame video to presenting live video.

According to a second aspect of the disclosure, a VCS host electronic device is configured to perform the freeze frame transition processes described above. The VCS host device includes a communication subsystem that enables the device to communicatively connect a first communication device and at least one second communication device via a video communication session. The VCS host electronic device includes a memory having stored thereon a video communication host application and a freeze frame video (FFV) module with program code for selectively presenting, during the video communication session, a freeze frame video of a first participant associated with the first communication device. The FFV module includes a freeze frame video transition (FFT) sub-module for responding to and minimizing visually disruptive changes detected with a live video feed during a transition from presenting the freeze frame video back to presenting a received live video feed. The host communication device includes a processor communicatively connected to the communication subsystem and the memory. The processor processes program instructions of the video communication host application and the FFV module to configure the host communication device to present, via the video communication session, at least a first video including the first participant. The processor presents, in response to a freeze frame video trigger associated with the first communication device, a freeze frame video including a video of the first participant with a first background image. The processor configures the VCS host electronic device to receive from the first communication device, while presenting the freeze frame video, live video of a field of view of an image capturing device of the first communication device, the live video including the first participant in the foreground and a current background being transmitted within the live video. The processor detects, based on a comparison of the live video with the freeze frame video, a change in at least one visual characteristic of the live video that can present a visual distraction to other participants of the video communication session while transitioning from presenting the freeze frame video to presenting the live video to the video communication session. In response to detecting the change, the processor configures the host electronic device to modify aspects of the live video to provide a modified live video that retains the at least one visual characteristic consistent with the freeze frame video. The host electronic device presents the modified live video to the video communication session on transition from presenting the freeze frame video.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the communication/electronic devices are also described as features and functions provided by a plurality of corresponding methods and computer program products, within the various different embodiments presented herein. In the embodiments presented as computer program products, the computer program product includes a non-transitory computer readable storage device having program instructions or code stored thereon, which enables the communication device and/or host electronic device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

As utilized herein, the term "participant or user" generally refers to a person who is communicating with other participants, each using respective participant communication devices communicatively connected to a video communication session. Based on a setting of the participant's device, the communication and/or electronic devices are able to generate freeze frame videos from a live video stream and replay the freeze frame video, as needed, in response to a context-based trigger. In different implementations, the foreground image captured within the field of view of the image capturing device can be of a non-human entity, object or being, such that a human participant is not necessarily required for implementing the specific features of the disclosure. For example, the foreground "participant" can be an animal, such as a dog. However, for simplicity, all of the disclosed embodiments assume there is a human participant visible within and presenting the foreground image of the FOV. The background video or background image can be a real background captured in real time, an integrated background, or a virtual background.

Those of ordinary skill in the art will appreciate that the hardware components and basic configuration depicted in the following figures may vary. For example, the illustrative components within first communication device 110 (FIGS. 2 and 3) and VCS host electronic device 135 (FIG. 9) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example video communication session (VCS) environment 100 having a first communication device 110 providing a freeze frame video to at least one second communication device 140*a*-140*n* via a video communication session 136 hosted by a VCS host electronic device 135, according to one or more embodiments. Communication device 110 is a mobile communication device that (i) supports video communication with other electronic/communication devices and (ii) includes one or more image capturing devices/sensors (i.e., cameras) 115. In one or more embodiments, communication device 110 is a mobile phone and/or incorporates the features of a mobile phone. In one or more embodiments, communication device 110 is configured with the capability to be utilized as a web camera during the video communication session. According to one or more embodiment and throughout the description which follows, communication device 110 can be interchangeably referred to as participant device, first participant device, and/or first participant communication device, etc. As an example, communication device 110 can be interchangeably referred to as first participant device 110 to distinguish from second participant devices 140 (140a-140n), which are also communication devices, such as mobile phones or laptops, in one or more embodiments. For simplicity in describing certain features of the disclosure, where second participant devices 140a-140n are individually referenced, second participant devices 140a-140n can be individually presented as second participant device 140a and third participant device 140n, etc.

VCS environment 100 includes local participant 105 who communicatively connects to video communication session 136 using communication device 110 that is wired or wirelessly connected to local display device 120. Communication device 110 is positioned on a desk proximate to local participant 105. In the described embodiments, communication device 110 is a smartphone held by docking hub/dongle 112 and includes at least one (and potentially multiple) image capturing device (ICD) 115. Docking dongle 112 provides a wired connection to local display device 120 on which video images captured by ICD 115 and video feeds (129) received from video communication session 136 can be displayed for viewing by local participant 105. ICD 115 captures a field of view (FOV) (illustrated by the dashed lines and generally presented as FOV 117) of the local surroundings, which includes a foreground image of local participant 105, in the illustrative embodiment, and any background image in the area surrounding local participant 105. ICD 115 generates live video/images of local participant 105 (i.e., the images/video captured within the FOV) with a corresponding background image for transmitting to video communication session 136. Communication with video communication session 136 can be established via operation of a video communication application (VCA) executing locally on communication device 110 and/or a computer system (not specifically shown) to which communication device 110 is connected to provide web camera functionality. VCA generates VCA user interface (UI) 122 presented on display device 120. VCA UI 122 presents a primary video 124, which is the main video being shown on the respective devices of each participant to the VCS. VCA UI 122 can also present a participant window 123 showing the local video or the still image, icon, or avatar of each of the participants, including that of local participant 105. In at least one embodiment, a preview image 127 is also presented to local participant, presenting local participant with the preview of the video images being captured in the FOV of the ICD 115. For purposes of the illustration, the primary video 124 presented on the VCA UI 122 is a live video feed of the locally captured FOV. Preview image 127 is thus the same as primary video 124 being presented to the video communication session 136.

Display device 120 is external to communication device 110 and can thus be referred to as external display device

120. Communication device 110 can also include an integrated display on one or more surfaces of communication device 110.

According to one aspect of the disclosure, communication device 110 generates and transmits, to the VCS, at least one freeze frame video 128 in addition to and/or in place of live video 125, based on one or more contexts that serve as automatic triggers for activating the presentation of a selected freeze frame video 128. This FFV 128 can present the (previously-recorded) local participant 105 as being presently engaged with the VCS 136. During presentation of freeze frame video 128 to video communication session 136, the device's ICD 115 continues to capture video from the ICD's FOV to enable transition back to the live video feed at the end of the presentation of the FFV 128. According to one aspect of the disclosure, a modified live video 126 is generated and transmitted in place of live video 125.

As shown, FFV 128 and live video 125 or modified live video (LV) 126 are transmitted through communications network 130, which includes wireless communication network 132 and associated physical networking components and wide area network 134 and associated physical networking components. Wide area network 134 provides or supports connection by video communication session (VCS) host electronic device(s) 135, which process host-level functions for video communication session 136. FFV 128 and subsequently-transmitted, modified LV 126 are forwarded by VCS host device(s) 135 to each session-connected second communication device, i.e., second communication devices 140a-140n. Second communication devices 140a-140n presents the received video feed 129 (i.e., FFV 128 followed by modified LV 126) on respective remote display devices 142 for viewing by their respective remote participants 144a-144n.

Second communication devices 140a-140n are shown having second displays, which are remote displays 142a-142n on which FFV 128 followed by modified LV 126 can be presented. According to one aspect, a granular application of the FFV transition feature can be implemented to allow only some of the second participant devices 140 (e.g., second participant device 140a) to receive and present the FFV 128 and/or the modified LV 126 from first participant device 110, while other second participant devices, e.g., third participant device 140n, receive a still image or null image 141 instead of the FFV 128 or modified LV 126.

Figure 2:
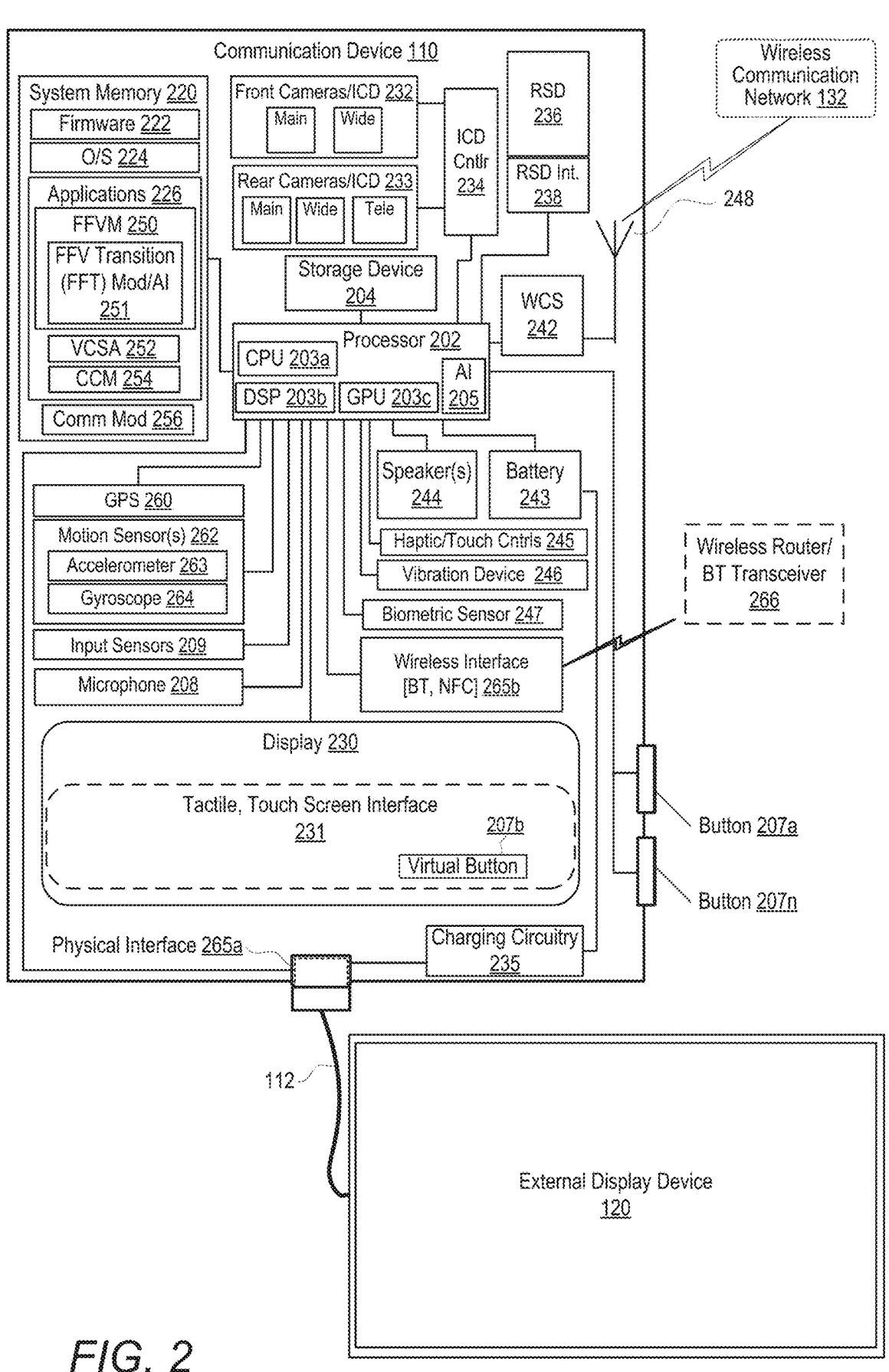
FIG. 2 depicts an example component makeup of the communication device used to engage in the video communication session and within which various aspects of the disclosure can be implemented, according to one or more embodiments.

FIG. 2 depicts an example component makeup of communication device 110 of FIG. 1, with specific components used to enable the device to engage in a video communication session and within which various aspects of the disclosure can be implemented, according to one or more embodiments. Examples of communication device 110 include, but are not limited to, mobile devices, a notebook computer, a mobile phone, a smart phone, a digital camera with enhanced processing capabilities, a smart watch, a tablet computer, and other types of communication device that incudes or can be directly connected to an image capturing device (ICD) (or camera) that captures video. It is appreciated that communication device 110 can be other types of communication devices that include at least one camera (image sensor) and which supports video communication with one or more second communication devices.

Communication device 110 includes processor 202 (typically as a part of a processor integrated circuit (IC) chip), which includes processor resources such as central processing unit (CPU) 203a, communication signal processing resources such as digital signal processor (DSP) 203b, and graphics processing unit (GPU) 203c. Processor 202 can, in some embodiments, include high quality camera image signal processors (ISPs) (not shown) and dedicated artificial intelligence (AI) engines 205. Collectively, processor 202 supports computing, classifying, processing, transmitting and receiving of data and information, and presenting of graphical images within a display. Processor 202 is communicatively coupled to storage device 204, system memory 220, input devices (introduced below), output devices, including integrated display 230, and image capture device (ICD) controller 234. According to one or more embodiments, ICD controller 234 performs or supports functions such as, but not limited to, selecting and activating an active camera from among multiple cameras and adjusting the camera settings and characteristics (e.g., shutter speed, f/stop, ISO exposure, zoom control, field of view (FOV) angle, etc.) of the active camera. ICD controller 234 can perform these functions in response to commands received from processor 202, which processes instructions of camera control module 254 in order to control ICDs 232, 233 to capture video or still images of a local scene within a FOV (117, FIG. 1) of the operating/active ICD.

For the above-described processes, the present disclosure normalizes the natural freeze frame loop to align segmentation regions in response to detection of a scene change or change to the foreground participant. The transition from the natural freeze frame loop to live video is normalized so that when the video frame moves to an unfrozen state, the transition is visually smooth. According to one embodiment, the simple/smooth transition is performed by transitioning to cropped region of interest if/when the subject moves within the FOV of the image capturing device during presentation of the freeze frame video. In one embodiment, subject tracking features are applied to ensure the subject remains within the main region of interested presented by the live video. With these methods, movement of the video frame from the freeze frame video to the live video does not cause any sudden disruption in the video communication session.

In one or more embodiments, the functionality of ICD controller 234 is incorporated within processor 202, eliminating the need for a separate ICD controller. Thus, for simplicity in describing the features presented herein, the various camera selection, activation, and configuration functions performed by the ICD controller 234 are described as being provided generally by processor 202. Similarly, manipulation of captured images and videos are typically performed by GPU 203*c* and certain aspects of device communication via wireless networks are performed by DSP 203*b*, with support from CPU 203*a*. However, for simplicity in describing the features of the disclosure, the functionality provided by one or more of CPU 203*a*, DSP 203*b*, GPU 203*c*, and ICD controller 234 are collectively described as being performed by processor 202.

Throughout the disclosure, the term image capturing device (ICD) is utilized interchangeably to be synonymous with and/or refer to any one of front or rear facing cameras 232, 233. Front facing cameras 232 and rear facing cameras 233 are communicatively coupled to ICD controller 234, which is communicatively coupled to processor 202. Both sets of cameras 232, 233 include image sensors that can capture images that are within the field of view (FOV) of the respective ICD 232, 233. Communication device 110 can include multiple cameras having different functionality, such as a main camera capturing standard view, wide angle camera that captures a wide angle FOV, and telephoto ICD, which captures a telephoto FOV (zoom or magnified). In one or more embodiments, a single camera can be provided with camera control options to change the single camera lens to allow for wide angle and telephoto image capture.

System memory 220 may be a combination of volatile and non-volatile memory, such as random access memory (RAM) and read-only memory (ROM). System memory 220 can store program code or similar data associated with firmware 222, an operating system 224, and/or applications 226. During device operation, processor 202 processes program code of the various applications, modules, OS, and firmware, that are stored in system memory 220.

In accordance with one or more embodiments, applications 226 include, without limitation, video communication session application (VCSA) 252, freeze frame video (FFV) module 250, camera control module 254, and communication module 256. As provided in the figure, FFVM 250 can be a separate module that integrates its functionality within an existing VCSA 252. In one or more alternate embodiments, FFV module (FFVM) 250 is a module within (i.e., a sub-component of) VCSA 252. According to one aspect of the disclosure, FFVM 250 is enhanced to include FFV transition (FFT) module 251, which provides artificial intelligence (AI) code that supports the transition from presenting a freeze frame video to a video communication session to presenting a modified live video feed, in accordance with one or more embodiments. Each module and/or application (250-256) provides program instructions/code that are processed by processor 202 to cause processor 202 and/or other components of communication device 110 to perform specific operations, as described herein. Descriptive names assigned to these modules add no functionality and are provided solely to identify the underlying features performed by processing of the different modules. For example, VCSA 252 and communication module 256 include program instructions that supports communication device 110 establishing a communication session with other external devices and systems, such as VCS host device 135 and second communication devices 140*a*-140*n* (FIG. 1).

Communication module 256 within system memory 220, enables communication device 110 to communicate with wireless communication network 132 and with other devices, such as second communication devices 140, via one or more of audio, text, and video communications. Communication module 256 can support various communication sessions by communication device 110, such as audio communication sessions, video communication sessions, text communication sessions, communication device application communication sessions, or a dual/combined audio/text/video communication session.

FFVM 250 includes program instructions that configure processor 202 and/or an AI program to generate a freeze frame video (FFV) from a live video feed and then present the FFV in place of a standard static image or in the event of a low-quality connection or other condition that triggers the presentation of the FFV. As introduced above, FFV transition module 251 can provide additional functions related to transitioning from presenting a freeze frame video.

In one or more embodiments, communication device 110 includes removable storage device (RSD) 236, which is inserted into RSD interface 238 that is communicatively coupled via system interlink to processor 202. In one or more embodiments, RSD 236 is a non-transitory computer program product or computer readable storage device. RSD 236 may have a version of one or more of the applications (e.g., 250, 251, 252, 254) stored thereon. Processor 202 can access RSD 236 to provision communication device 110 with program code that, when executed/processed by processor 202, the program code causes or configures processor 202 and/or generally communication device 110, to provide the various different FFV and FFT functions described herein.

Communication device 110 includes an integrated display 230 which incorporates a tactile, touch screen interface 231 that can receive user tactile/touch input. As a touch screen device, integrated display 230 allows a user to provide input to or to control communication device 110 by touching features within the user interface presented on display screen. Tactile, touch screen interface 231 can be utilized as an input device. As one aspect of the disclosure, communication device 110 also includes external display device 120, which is communicatively coupled to communication device 110 via a physical interface 265a or a wireless interface 265b. External display device 120 can be one of a wide variety of display screens, monitors, or devices, such as a liquid crystal display (LCD) and an organic light emitting diode (OLED) display. In some implementations, integrated display 230 is integrated into a front surface of communication device 110, while the higher quality ICDs are located on a rear surface. Communication device 110 is placed in an orientation with the FOV of the higher quality ICDs capturing an image/video, which includes the participant in the foreground of a background scene. Integrated display is thus located away from the participant, who relies on the connected larger external display device 120 for video output.

To enable the audio communication aspects for video communication session, communication device 110 further includes microphone 208, one or more output devices such as speakers 244, and one or more input buttons 207a-207n. Microphone 208 can also be referred to as an audio input device. Input buttons 207a-207n may provide controls for volume, power, and ICDs 232, 233. According to one or more embodiments, input buttons 207a-207n can include dedicated hardware button 207a and/or dedicated virtual bottom 207b for use to activate/initiate freeze frame presentation function via manual selection. Microphone 208 and input buttons 207a-207n can also be referred to generally as input devices. Additionally, communication device 110 can include input sensors 209 (enabling gesture detection by local participant).

Communication device 110 further includes haptic touch controls 245, vibration device 246, fingerprint/biometric sensor 247, global positioning system (GPS) device 260, and motion sensor(s) 262. Vibration device 246 can cause communication device 110 to vibrate or shake when activated. Vibration device 246 can be activated during an incoming call or message in order to provide an alert or notification to a user of communication device 110. In one or more embodiments, vibration device 246 can be used to inform the user when FFV is being generated and/or when a FFV is being presented by communication device 110. According to one aspect of the disclosure, integrated display 230, speakers 244, and vibration device 246 can generally and collectively be referred to as output devices.

Biometric sensor 247 can be used to read/receive biometric data, such as fingerprints, to identify or authenticate a user. GPS device 260 can provide time data and location data about the physical location of communication device 110 using geospatial input received from GPS satellites. Motion sensor(s) 262 can include one or more accelerometers 263 and gyroscope 264. Motion sensor(s) 262 can detect movement of communication device 110 and provide motion data to processor 202 indicating the spatial orientation and movement of communication device 110. Accelerometers 263 measure linear acceleration of movement of communication device 110 in multiple axes (X, Y and Z). Gyroscope 264 measures rotation or angular rotational velocity of communication device 110. In one or more embodiments, the measurements of these various sensors can also be utilized by processor 202 in the determining of the context of a communication. Communication device 110 further includes housing that contains/protects the components internal to communication device 110.

Communication device 110 further includes wireless communication subsystem (WCS) 242, which can represent one or more front end devices (not shown) that are each coupled to one or more antennas 248. In one or more embodiments, WCS 242 can include a communication module with one or more baseband processors or digital signal processors, one or more modems, and a radio frequency (RF) front end having one or more transmitters and one or more receivers. WCS 242 and antennas 248 allow communication device 110 to communicate wirelessly with a wireless communication network 132 (FIG. 1) via transmissions of communication signals to and from network communication devices, such as base stations or cellular nodes, of wireless communication network 132.

Wireless communication network 132 further allows communication device 110 to wirelessly communicate with second communication devices 140a-140n, which can be similarly connected to wireless communication network 132. Communication device 110 can also communicate wirelessly with wireless communication network 132 via communication signals transmitted by short range communication device(s) to and from an external WiFi router 266, which is communicatively connected to wireless communication network 132. In one or more embodiment, wireless communication network 132 can be interconnected with a wide area network that can include one or more devices (e.g., VCS host device 135) that support exchange of audio and video messages and other communication between communication device 110 and second communication devices 140a-140n.

Wireless interface 265b can be a short-range wireless communication component providing Bluetooth, near field communication (NFC), and/or a wireless fidelity (Wi-Fi) connections. In one embodiment, communication device 110 can receive Internet or Wi-Fi based calls via wireless interface 265b. In one embodiment, communication device 110 can communicate wirelessly with external wireless transceiver device 266, such as a WiFi router or BT transceiver, via wireless interface 265b. In an embodiment, WCS 242, antenna(s) 248, and wireless interface 265b collectively provide communication interface(s) of communication device 110. These communication interfaces enable communication device 110 to communicatively connect to host electronic device 135 and at least one second communication device 140 (FIG. 1) via at least one network.

Communication device 110 also includes a physical interface 265a. Physical interface 265a of communication device 110 can serve as a data port and can be coupled to charging circuitry 235 and device battery 243 to enable recharging of device battery 243.

Figure 3:
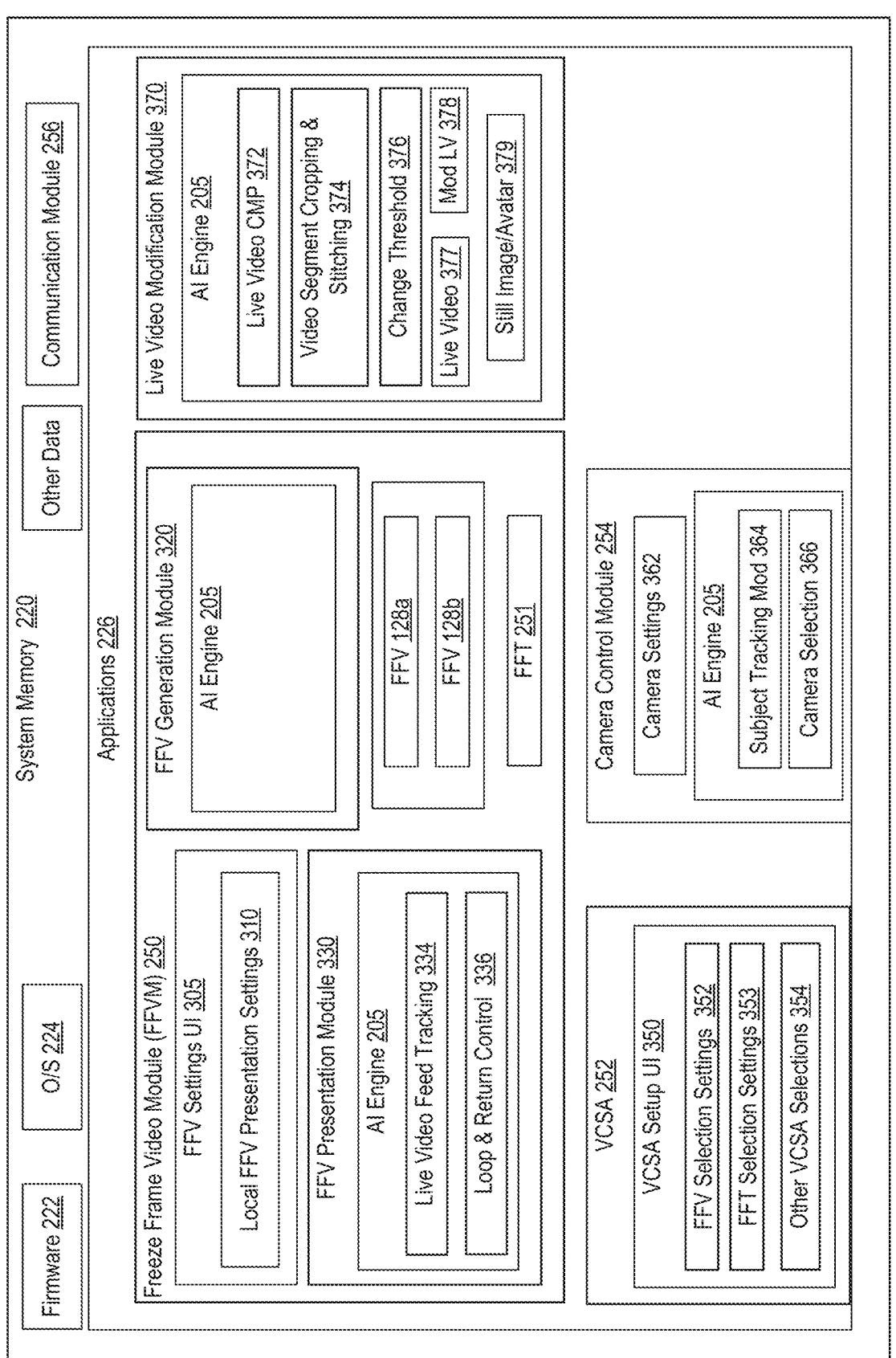
FIG. 3 is a block diagram representation of example contents of the system memory of the example communication device of FIG. 2, which contents collectively enable the device to complete several of the disclosed features, according to one or more embodiments.

FIG. 3 is a block diagram representation of example contents of the system memory of example communication device 110 of FIGS. 1 and 2, according to one or more embodiments. The contents collectively enable the processor 202 of the communication device to complete many of the features disclosed herein. Processor 202 processes program code and utilizes specific data associated with the content within memory to collectively enable several of the disclosed features, according to the various embodiments.

As generally introduced within FIG. 2, system memory 220 includes data, software, and/or firmware modules, including firmware 222, operating system 224, applications 226, and communication module 256. Applications generally include FFVM 250, with FFT module 251, and also includes VCSA 252 and camera control module (CCM) 254.

FFVM 250 includes code for FFV settings UI 305, which provides a series of selectable options for setting up and presenting FFVs, including local FFV presentation settings 310. FFVM 250 also includes a FFV generation module 320 and FFV presentation module 330. FFV presentation module 330 includes or incorporates an AI engine 205 which provides among other features, live video feed tracking 334 that enables the live feed to continue to be provided to a local display, and loop and return control 336 that controls how long the FFV is looped and what content (if any) is presented when the FFV presentation ends or is terminated/interrupted. FFV settings UI 305 presents selectable options for loop and return control 336, which options identify what type of image or video feed, if any, to present to the video communication session, following completion of the looping of the FFV.

VCSA 252 includes code for presenting VCSA setup user interface (UI) 350, within which are code for FFV selection settings 352, which includes FFV transition settings 353, and other VCS application settings/selections 354.

CCM 254 includes camera parameters and settings 362, and AI engine 205, which further includes subject tracking module 364 and camera selection module 366. Camera parameters and settings 297 can include fixed values such as focal length, maximum frame rate, and resolution and variable values such as light level values, directional values, and distances to objects within a camera FOV. Camera parameters and settings 297 are values and characteristics that can change during the operation of ICDs 232, 233 to capture images by the cameras. Camera parameters and settings 297 can include various settings such as aperture, shutter speed, iso level, white balance, zoom level, pan, directional settings (i.e., region of interest (ROI)), distance settings, focus and others. In one embodiment, camera parameters and settings 297 can be determined by either processor 202 or by ICD controller 234 or AI engine 205. Subject tracking module 364 allows ICDs to zoom in and adjust a focal position of the lens within the ICD to allow the ICD to maintain a view of the user, while in the FOV of the ICD and, in particular, during generation of the FFV and subsequent capturing of the live video.

Also included within memory is live video modification module (LVMM) 370, which provides the code for completing the various types of modification of live video that are described herein. LVMM 370 includes AI engine 205, which provide program code segments for performing FFV to live video compare 372 and video segment cropping and stitching 374. AI Engine 205 is also programmed with one or more change thresholds 376 that are data points used to determine when the amount of change in the captured live video 377 would trigger a modification of the live video into modified live video 378 to prevent or minimize disruptions during transition from FFV to live video. LVMM 370 can also include still images and/or an avatar 379 of the first participant.

Each of the various modules and applications includes program instructions/code that is processed by processor 202 and, in some instances by AI engine 205, to configure communication device 110 to perform the various different features of the present disclosure. In one or more embodiments, several of the modules include a representation (or code segments) of AI engine 205, which can further include a machine learning (ML) engine (not separately shown) and computer vision (CV) engine (not separately shown). In one embodiment, AI engine 205 enables communication device 110 to perform several of the described FFV and FFT processes, as well as other features and functions of communication device 110. In one or more embodiments, execution (or processing) of the various modules by processor 202 enables/configures communication device 110 to perform the method processes presented in the various different flowcharts, as will be described below.

Figure 4:
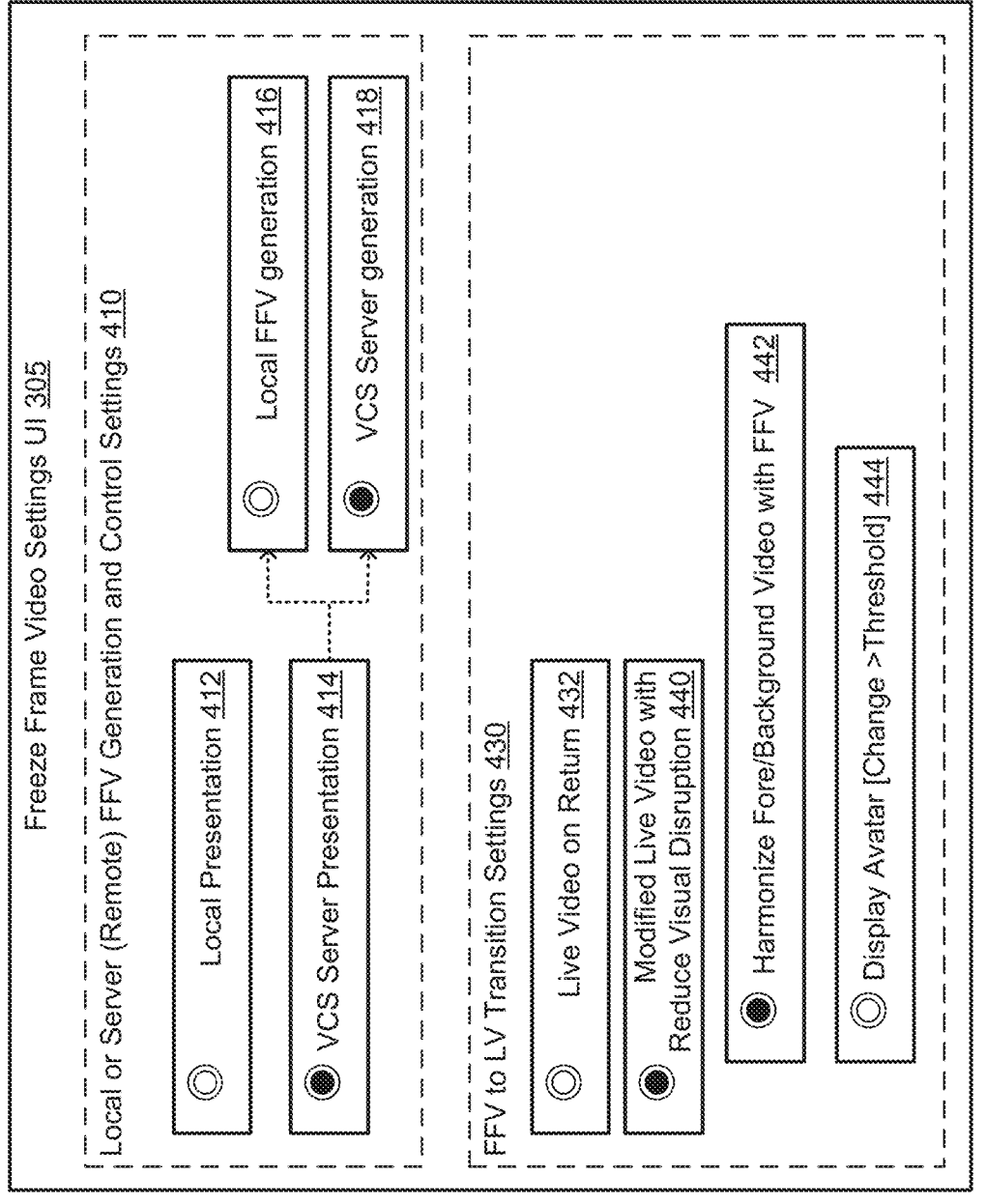
FIG. 4 depicts a setup user interface for a video communication application operating on the communication device of FIG. 2 and presenting user selectable options for transitioning from presenting a freeze frame video to presenting a selected one of a live or a modified live video, in accordance with one or more embodiments.

FIG. 4 depicts an example FFV settings/setup user interface (UI) 305 associated with a VCS application (VCSA) 252 operating on the communication device 110. The FFV settings UI 305 presents user selectable options for (i) activating local or host device freeze frame video generation and presentation from a live video feed and (ii) establishing options for transitioning back to presenting a live video or modified live video after presenting a freeze frame video, in accordance with one or more embodiments. In one embodiment, the FFV settings UI 305 is generated and presented on a display of a local participant device 110 based on user input/selection of a freeze frame setting option within the video communication application GUI (not shown). As shown, FFV settings UI 305 includes first local/remote FFV generation selection window 410 and FFV transition settings selection window 430. Local/remote FFV generation selection window 410 enables user election of local device presentation 412 or remote, host electronic device presentation 414 of freeze frame videos. When host electronic device presentation is selected, additional selection options are provided for local FFV generation 416 or VCS host device FFV generation 418, whereby the user is able to select whether FFV generation is completed by the local communication device (110) or at the VCS host device 135.

FFV transition settings selection window 430 includes selectable options including transitioning to live video feed option 432 (i.e., without modification of the video) or transitioning to live video with reduced visual disruption option 440. Selection of live video with reduced visual disruption option 440 generates secondary selections for harmonizing foreground and/or background video with that of the FFV 442 or displaying a preselected avatar or image 379 (FIG. 3). In one or more embodiments, the avatar or image selections 444 is triggered only when the change in the visual content of the live video is greater than a pre-established threshold. In one or more embodiments where both the foreground and background changes are too significant simply modify one or the other video images, an avatar or still image is presented in place of the live video. Alternatively, where the detected changes are to the background video image, the processor blurs the background image sufficiently to make the background image somewhat obscure to the other participants and/or to highlight the foreground participant as the focus of the video, in one embodiment.

The preceding presentation of FIGS. 1-4 collectively provides an communication device 110 having at least one image capturing device (ICD) that captures video and images from a field of view (FOV) of the at least one image capturing device. The communication device 110 includes a communication subsystem that enables the communication device to communicatively connect to a video communication session with at least one second communication device. The communication device includes a memory having stored thereon a video communication application and a freeze frame video (FFV) module with program code for selectively presenting a freeze frame video during the video communication session. The FFV module includes a FFT sub-module, which enables the communication device to respond to and minimize visually disruptive changes detected within a live video feed captured for presentation during a transition from the freeze frame video. The communication device includes at least one processor communicatively coupled to the at least one image capturing device, the communication subsystem, and the memory. The at least one processor processes program instructions of the video communication application and the freeze frame video module (and in particular the FFT sub-module) to configure the communication device to perform the following series of operations. The communication device presents a freeze frame video to the video communication session in response to a trigger received at the communication device while the communication device is connected to the video communication session. The freeze frame video includes a foreground image of a first participant with a FFV-presented background. The processor configures the communication device to capture, via the at least one image capturing device while presenting the freeze frame video, live video of the FOV, which includes the first participant and a current background. The communication device is further configured to detect, within the live video, a change in at least one visual characteristic of the live video that can present a visual distraction to other participants of the video communication session while transitioning from presenting the freeze frame video to presenting the live video to the video communication session. Additionally, the communication device is configured to, in response to detecting the change, modify aspects of the live video to provide a modified live video that retains the at least one visual characteristic consistent with the freeze frame video. The communication device presents the modified live video to the video communication session on transition from presenting the freeze frame video to presenting the live video.

Figures 5A, 5B, 5C:
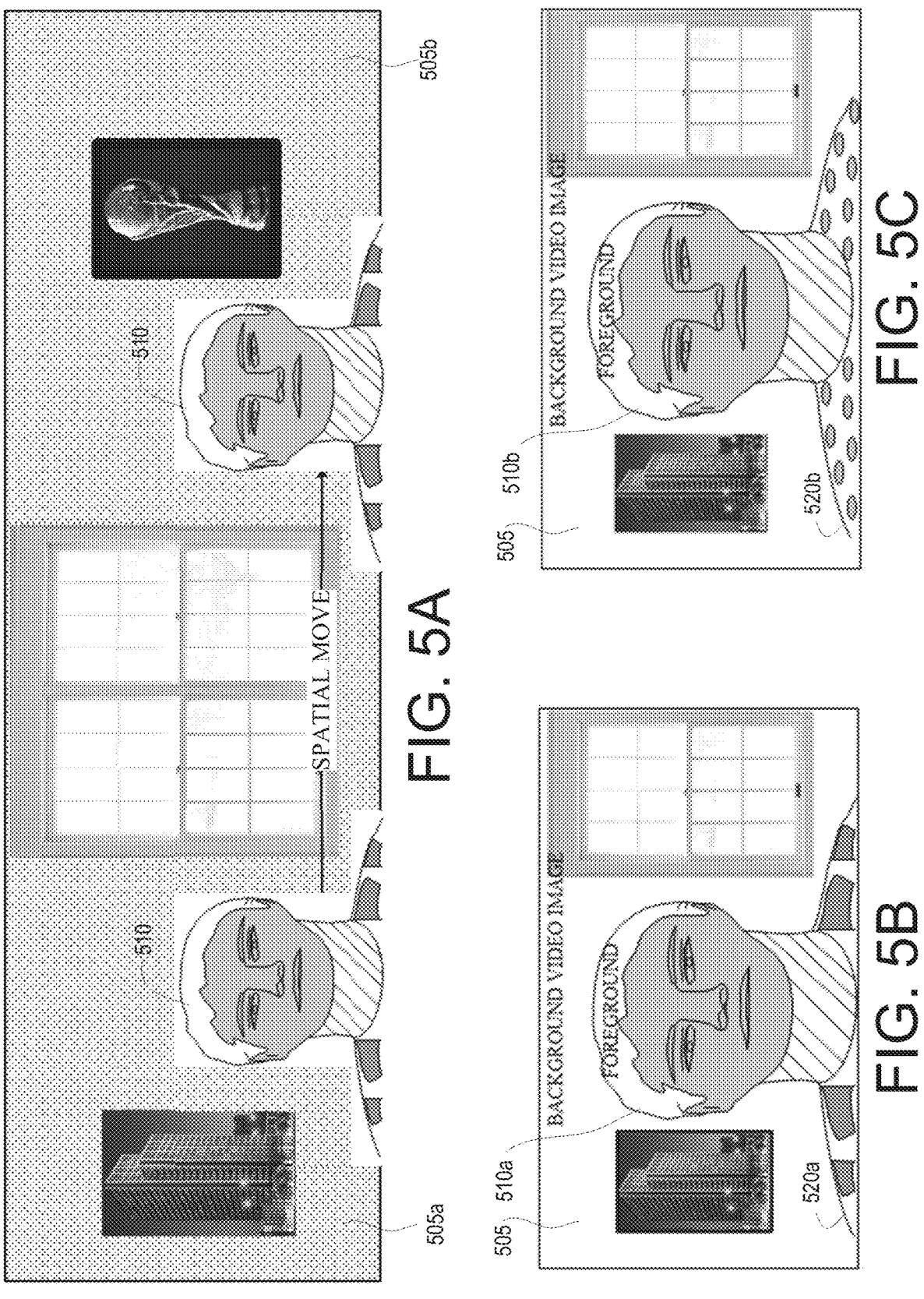
FIGS. 5A and 5B-5C respectively illustrate different changes that can occur in a captured live video scene that would trigger creation of a modified live video to reduce the visual disruption in the video communication session during a transition from presenting the freeze frame video to presenting the live video, according to one or more embodiments.

FIGS. 5A and 5B-5C respectively illustrate different changes that can occur in a captured live video scene that would trigger creation of a modified live video to reduce the visual disruption in the video communication session during a transition from the freeze frame video to the live video, according to one or more embodiments. The captured scene in the live video includes a foreground image of a participant 510 in front of a background image 505, which includes a wall, pictures on the wall and a window. As shown by FIG. 5A, the wall extends on both sides of the widow with two different pictures on the left and right thereof. At a first time, participant 510 is physically located to the left of the window. A freeze frame video is captured while the foreground participant is located at that first location. At a later time, while the freeze frame video is being presented on the video communication session, participant 510 moves to a second location that is to the right of the window. It is appreciated that while the illustrated lateral shift occurs in an adjacent physical space, the change can be a different position shift in the same room or a move to a completely different room or location from the original location at which the freeze frame video was recorded. When the move occurs during presentation of the freeze frame video, the visual change in the scene (i.e., the background and/or location of the participant 510) is detected in the live video, which is being captured by the device's ICD in the background. The visual change involves a lateral shift of the foreground participant 510 to a different location that presents a different background image from what is presented in the freeze frame video being shown to the VCS. The AI 205 compares the original background of the FFV to the new background and determines when/whether the change in the background image is more than a change threshold. The AI 205 then triggers the generation of a modified live video, as described herein, according to one or more embodiments.

Alternatively and/or in addition, as illustrated by FIGS. 5B and 5C, viewed in time sequence from FIG. 5B to FIG. 5C, the background image 505 remains the same, but the foreground participant 510a has changed his appearance by changing his shirt, from a first pattern or color shirt 520a to a second pattern or color shirt 520b. The transition illustrates a second change in a captured live video scene from a presented FFV that is a change in attire of the foreground participant 510b, which change occurs during presentation of a freeze frame video to the video communication session. Viewed in real time, during transition from the freeze frame video showing the participant 510a with the first pattern/color shirt 520a, the presentation of the participant 510b in the second different color/pattern shirt 520b is an abrupt visual change. The AI 205 detects the change in the designs of the shirts 520a, 520b and determines that the change is sufficient to potentially create a distraction (i.e., the amount of detected change is greater than a corresponding threshold change). The AI 205 thus triggers the generation of the modified live video, as described herein, according to one or more embodiments.

According to one or more embodiments, with respect to the FIG. 5A example, the at least one visual characteristic is of the background presented within the live video, the local participant being included within a foreground image of the live video. The processor 202 of (or AI 205 within) the communication device 110 modifies aspects of the background within the live video to provide the modified live video that maintains visual characteristics of the background consistent with a FFV background presented within the freeze frame video.

In one embodiment, to detect the change, the at least one processor (or AI engine 205): identifies the background captured within the live video; compares visual characteristics of the background with the FFV background being presented within the freeze frame video; determines when differences in the visual characteristics between the background and the FFV background are greater than a pre-established difference threshold that results in the visual distraction during the transition from the freeze frame video to the live video In response to the differences being greater than the pre-established difference threshold, the at least one processor: extracts the FFV background from the freeze frame video; crops a foreground video section encompassing the first participant from the background of the live video; and integrates the foreground video segment into the FFV background to generate the modified live video.

In one or more embodiments, the change in the at least one visual characteristic of the background includes a different directional view and location of the first participant relative to the image capturing device. The at least one processor: detects a shift that is greater than a pre-established change threshold in at least one of a current directional angle of view and/or a current location/position of the first participant (within the live video) relative to FOV of the image capturing device, compared with the angle/location/position within the freeze frame video. And, the at least one processor adjusts at least one of (i) imaging criteria of the image capturing device and (ii) a selected ICD from among multiple available ICDs of the communication device, to reverse or reduce a visual effect of the detected shift in the live video and to substantially align a presented location and angle of the first participant with the directional angle and location/position presented within the freeze frame video.

In one or more embodiments, the change in the at least one visual characteristic of the background comprises an amount of ambient lighting illuminating the local participant and a background scene. The at least one processor: detects a change in the amount of ambient lighting within the live video above a corresponding lighting threshold change value; and modifies, via an image processing controller, one or more imaging criteria of at least one of the image capturing device and the captured live video to present the first participant with a similar amount of ambient lighting as within the freeze frame video.

In one or more embodiments, the background of the freeze frame video includes a selected first background image. The at least one processor: detects a user/device selection of a different background image to present within the live video from the first background image that is presented within the freeze frame video; and overwrites and replaces the different background image with the first background image in the live video that is presented to the video communication session.

In one or more embodiments, where the detected changes are to the background video image, the processor blurs the background image sufficiently to make the background image somewhat obscure to the other participants and/or to highlight the foreground participant as the focus of the video.

In one or more embodiments, the change in the at least one visual characteristic is of a foreground video image of the first participant presented within the live video, and the live video further includes a background within which the foreground video image is presented. The processor detects the change in the foreground video image. To modify the live video, the processor replaces the foreground video image of the first participant in the live video with a next foreground image to provide the modified live video. To perform the modification, the processor crops a FFV foreground video image from the freeze frame video and replaces the foreground video image with the FFV foreground video image to retain visual characteristics of the first participant from the FFV foreground video image within the modified live video.

In one or more embodiments, the processor selects a still image from among one or more pre-stored images of the local participant, an avatar of the local participant, or a FFV foreground image cropped from the freeze frame video. And, the processor replaces the foreground video image with the still image to transition from presenting a FFV foreground video image to presenting a still-image freeze frame.

In one or more embodiments, the processor automates generation of the modified live video as an automatic freeze frame transition feature for freeze frame video presentation during video communication sessions. In response to a user setting to override the automatic freeze frame transition feature, the processor presents the live video captured by the image capturing device (i.e., without modification) on transition from the freeze frame video.

FIGS. 6A-6B illustrate differences between the live video being locally captured by the communication device and the actual video feed being transmitted to the video communication session over a period of time during which a change in the background image is detected while a freeze frame video is temporarily presented to the video communication session, according to one or more embodiments. A timeline is presented between the two figures, as an arrow extending downwards as time increases from T0 to T5 and afterwards. The screen shots shown at different times along the timeline presents visual differences between FIG. 6A presenting a live video feed captured by the local ICD of the communication device 110 and FIG. 6B presenting the video feed that is actually transmitted to the VCS. The processes occurring during the timeline are presented as follows:

a. T1a-T1b: FFV Capture
    b. T2: Begin FFV Presentation; Begin capture/recording of Live Video
    c. T3: Detect visual change in Live Video from FFV>Change Threshold
    d. T4: Modify Live Video based on change detected
    e. T5: Stop presenting FFV; Present Modified Live Video.

As shown by FIG. 6A, the live video background changes at time T3 due to movement by the foreground participant to another location, which has a different background than the background recorded in the freeze frame video at T1. The new background is captured within the FOV of the camera and is sent to the image processor and AI, which compares the amount of change in the background with change threshold for background changes and determines whether the amount of change is above the threshold.

Ultimately, the second participants on the VCS who are receiving the video feed from the first communication device are presented with the foreground participant having a constant background image. This eliminates the distractions that would otherwise be visible to the second participants.

Figure 6C:
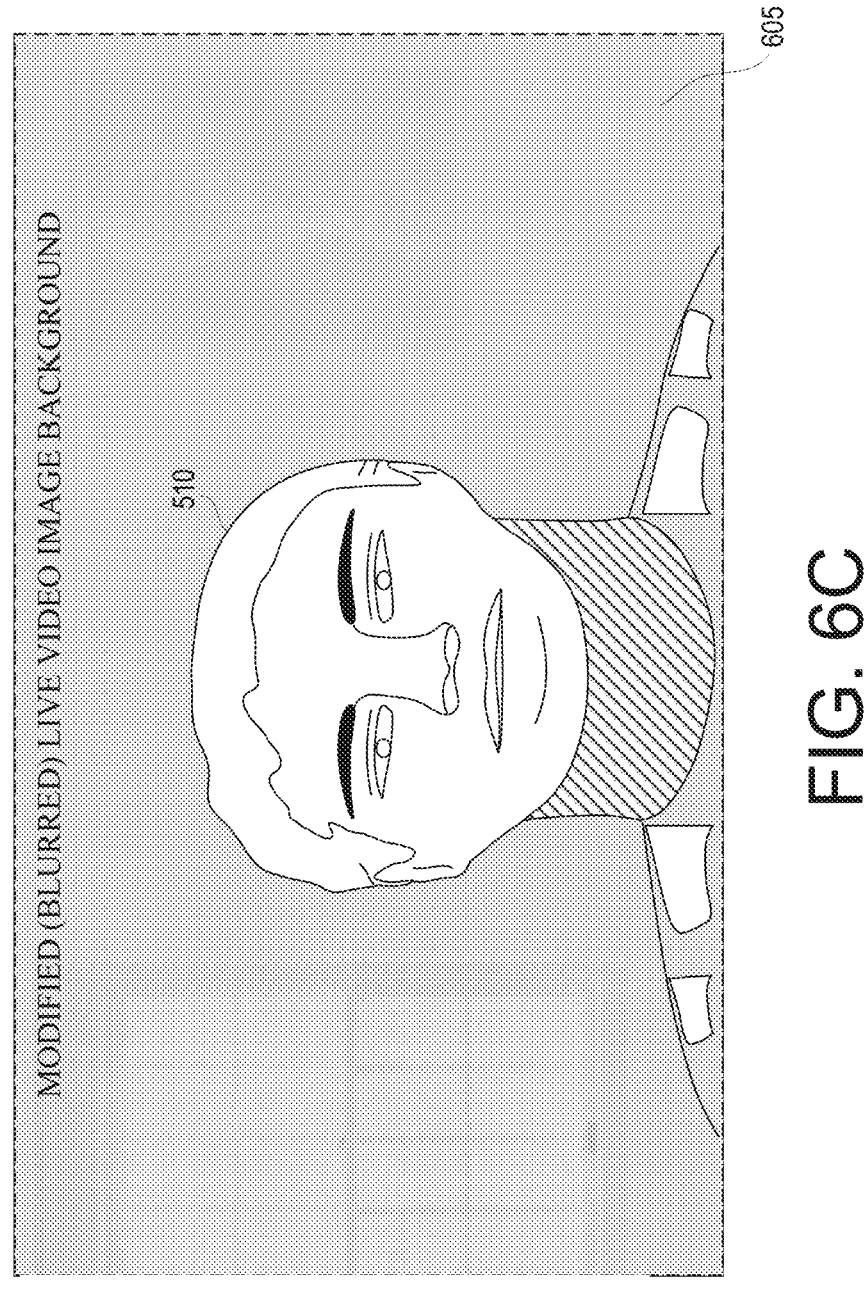
FIG. 6C illustrates a modified live video in which the background has been blurred to highlight the foreground image only within the live video due to an identified change in the live video background from the background presented in the freeze frame video prior to transitioning from presenting the freeze frame video, according to one or more embodiments.

FIG. 6C illustrates a modified live video in which the background has been blurred to highlight the foreground image only within the live video due to an identified change in the live video background from the background presented in the freeze frame video prior to transitioning from presenting the freeze frame video, according to one or more alternate embodiments. As shown, foreground participant 510 is presented on blurred background 605, with the blurring making the background relatively obscure while presenting the foreground image (510).

Figures 7A, 7B:
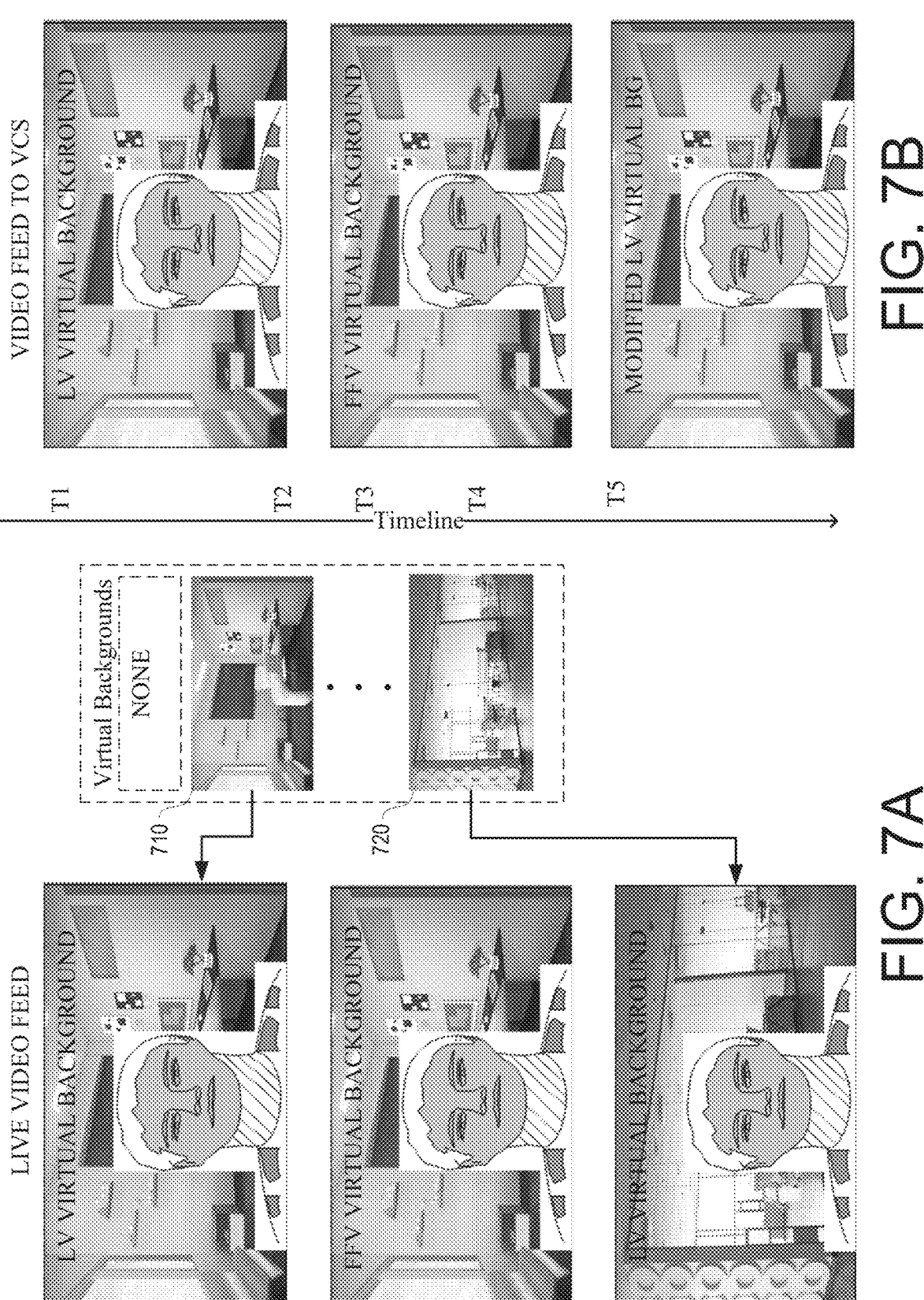
FIGS. 7A-7B illustrate differences between the live video image being locally captured by the communication device and the actual video feed being transmitted to the video communication session over a period of time during which a change in a user-selected virtual background image is detected while a freeze frame video is being temporarily presented to the video communication session, according to one or more embodiments.

FIGS. 7A-7B illustrate differences between the live video being locally captured by the communication device and the actual video feed being transmitted to the video communication session over a period of time during which a change in a user-selected virtual background image 710 is detected while a freeze frame video is being presented temporarily to the video communication session, according to one or more embodiments. As shown by FIG. 7A, the user selects a first virtual background 710, which is the background captured when generating the FFV. During presentation of the freeze frame video to the VCS, the user changes the virtual background to a second virtual background 720, which is the background depicted within the live video feed. The AI 205 recognizes that the differences in the two virtual backgrounds is greater than a change threshold for virtual backgrounds and the AI initiates the processes of modifying the live video to replace the virtual background shown to the VCS with the virtual background that is being shown in the freeze frame video. Thus, as provided by FIG. 7B, even though the user has selected a different virtual background for the live video transmission (as shown in FIG. 7A), the videos presented to the VCS appear to have a consistent background.

According to one alternate embodiment, the user may not be presented with an option to change his virtual background when a freeze frame video is currently being presented with a previously selected/applied virtual background. This eliminates the need for the AI to perform a virtual background image comparison, because no new virtual background can be applied to the live video during FFV presentation.

Figure 8:
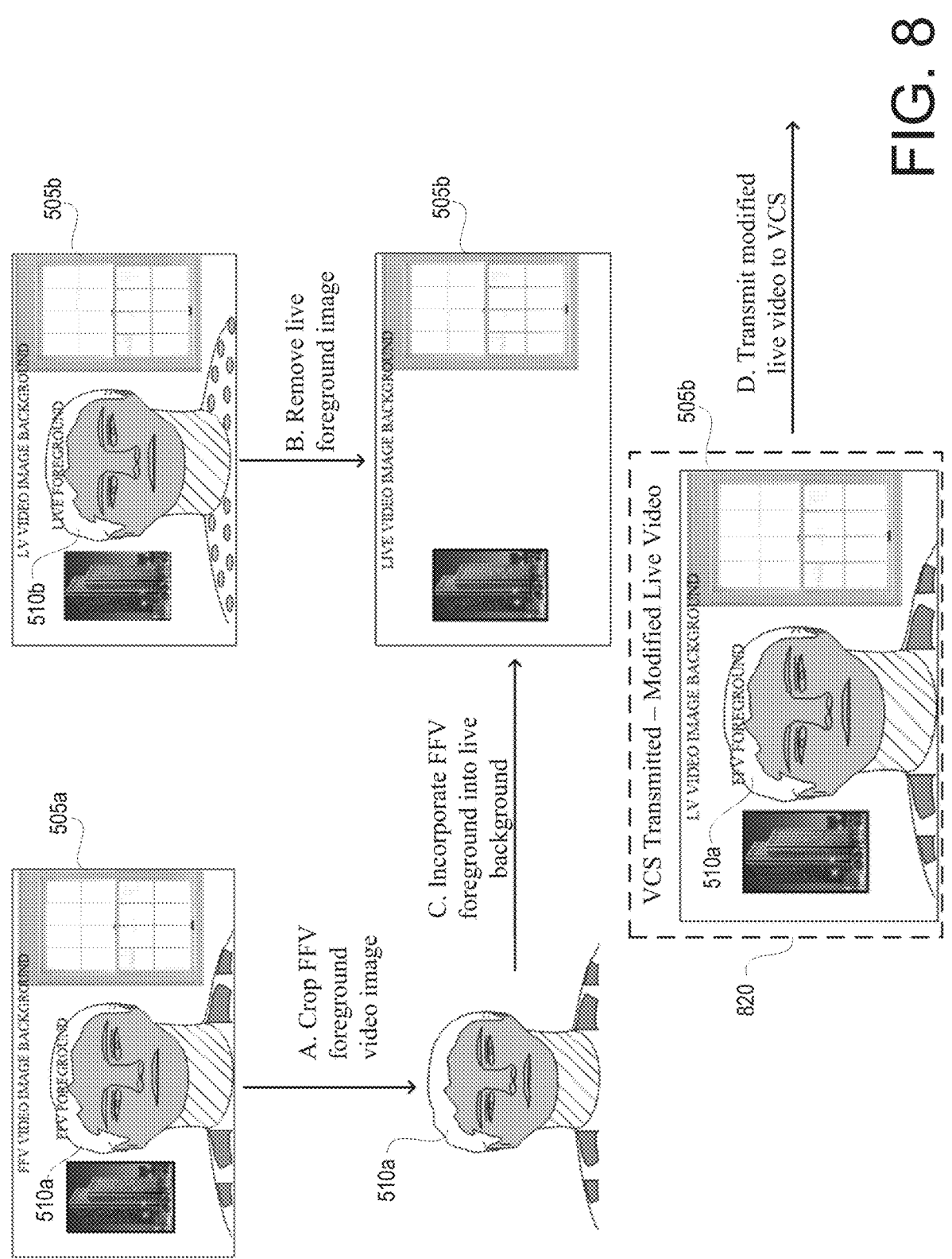
FIG. 8 illustrates a sequence of processes performed by the communication device to generate a modified live video to present to the video communication session following detection of a change in the foreground image of the live video feed that would/could cause a disruption in the visual consumption of the presented video by the other participants to the video communication session, according to one or more embodiments.

FIG. 8 illustrates a sequence of window images illustrating the processes performed by the communication device to generate a modified live video to present to the video communication session following detection of a change in the foreground image of the live video feed that would cause a disruption in the visual consumption of the presented video by the other participants to the video communication session, according to one or more embodiments. The sequence is presented alphabetically as follows: crop the FFV's foreground image 510a from the FFV background 505a; remove the live foreground image 510b from the live video background 505b; incorporate (insert, overlay, and/or stitch) the FFV foreground image 510a into the live video background 505b in place of the live foreground image 510b to generate modified live video 820; and transmit the modified live video to the video communication session.

It is appreciated that the live video captured by the ICD can include a different foreground object or foreground content than a video of a local human participant. Thus, the presentation of the local human participant within the foreground of the captured live video is solely for example, as the FFV transitioning features are fully applicable to presenting FFV with video content that does not include a local human participant.

According to one or more embodiments, prior to activating the FFT features, the processor determines a number of second participants on the video communication session and compares the number of second participants to a threshold number. The processor then initiates the modification of the live video feed in response to the number of second participants being less than the threshold number, where each participant, and thus the changes to the participant's transmitted video, is clearly visible on the display of the other participants. As one example, the threshold number can be 8 participants.

According to yet another embodiment, the processor can initiate the presenting of the modified live video in response to identifying that the first participant's video is not currently the primary video or being presented to the VCS, but likely being viewed by another participant on the video communication session. In contrast, in another embodiment, the processor determines that a current video focus of the video communication session is at least one of (i) presenting local video of and (ii) presenting content associated with or originating from at least one second participant, whereby the live video feed of the first participant is not currently in focus. The processor can then transition to presenting the un-modified live video in response to the video of the first participant not being currently in focus for others on the video communication session.

According to one or more embodiments, the communication device includes at least one output device communicatively coupled to the processor, the at least one output device including at least one of an embedded display device and an external display device. In determining whether to present live video or modified live video, the processor provides at least one prompt, via an output to one or more of the at least one output device, for user selection on live video or modified video on transition from the freeze frame video presentation.

According to one or more embodiments, the processor forwards the modified live video to a VCS host electronic device supporting the video communication session. The VCS host electronic device is programed to present the freeze frame video followed by the modified live video from the communication device to the video communication session in place of the un-modified local video captured by the communication device.

Figure 10:
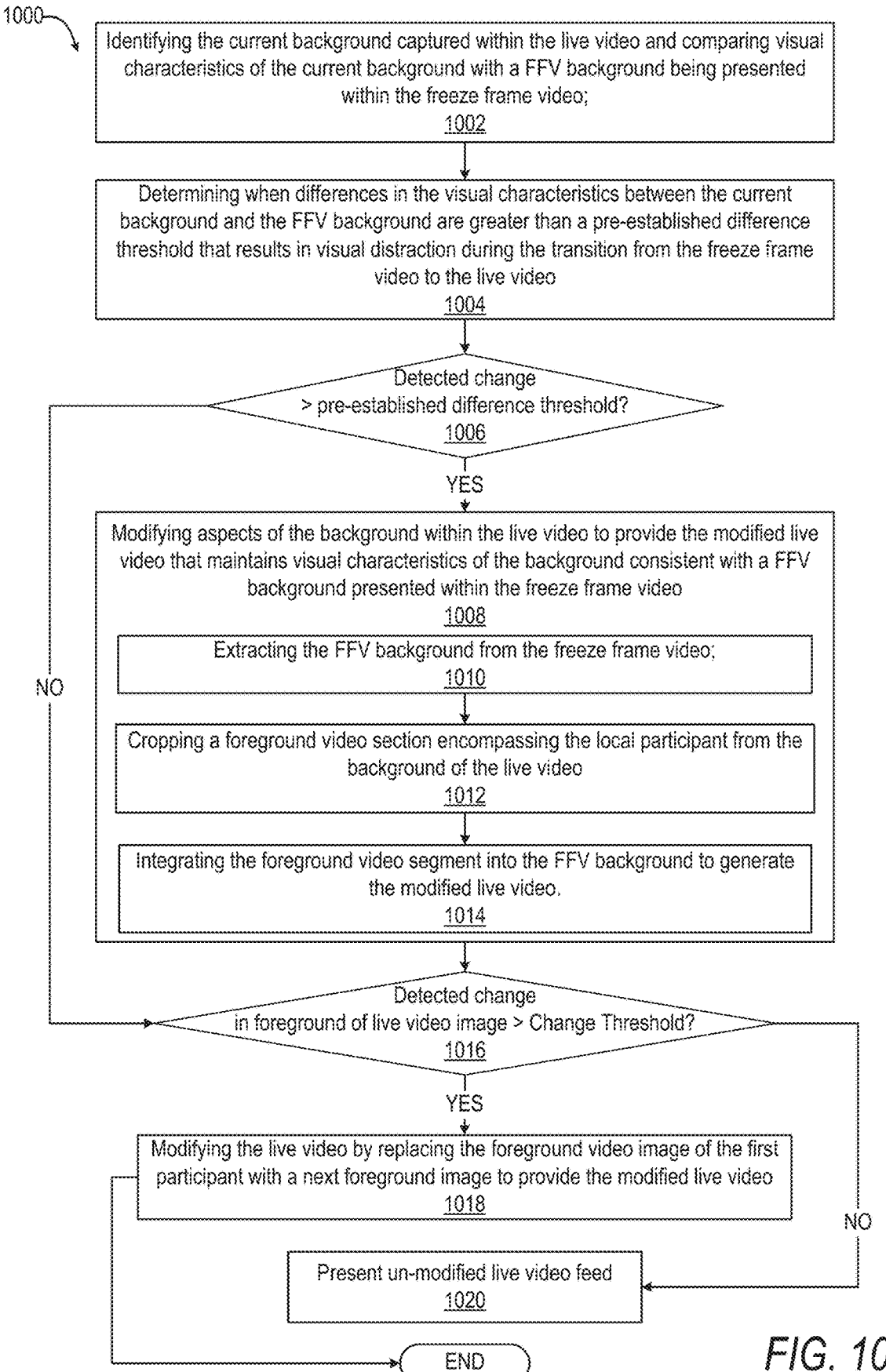
FIG. 10 depicts a flowchart of a method by which the communication device responds to detected visual changes in a background and/or a foreground of captured live video while presenting a freeze frame video to a video communication session, according to one or more embodiments.

FIG. 9 depicts a flowchart of a method 900 by which an communication device responds to detected visual changes in captured live video while presenting a freeze frame video to a video communication session, according to one or more embodiments. FIG. 10 depicts a flowchart of a method 1000 by which the communication device responds to detected visual changes in a background and in a foreground of captured live video while presenting a freeze frame video to a video communication session, according to one or more embodiments. The descriptions of the various methods presented herein are provided with general reference to the specific components illustrated within the preceding figures. Specific components referenced in methods 900 and 1000 may be identical or similar to components of the same name used in describing the preceding figures. The described features can be provided by the AI engine 205 and/or the processor 202, or a combination of both. Aspects of the methods 900 and 1000 are described as being performed by the processor 202 of communication device 110, which device is communicatively connected to a VCS with and second participants' devices 140 via VCS host device 135. The respective descriptions of methods 900 and 1000 are thus presented from the perspective of the communication device 110 and/or processor 202 (FIG. 2) making reference to the described devices, components, and features in the preceding FIGS. 1-8.

Referring to FIG. 9, method 900 begins at the start block and proceeds to block 902 at which method includes presenting, by at least one processor of an communication device, a freeze frame video to a video communication session in response to a trigger received at the communication device while the communication device is connected to the video communication session. The freeze frame video includes an image of a first participant to the video communication session with a background that is also presented within the freeze frame video. Method 900 incudes, while presenting the freeze frame video, capturing, via at least one image capturing device having a field of view (FOV), a live video which includes the first participant and a current background (block 904). Method 900 includes detecting, within the live video, a change in at least one visual characteristic of the live video that can present a visual distraction to other participants of the video communication session while transitioning from presenting the freeze frame video to presenting the live video to the video communication session (block 906). Method 900 includes, in response to detecting the change, determining, at decision block 908, whether the visual change is greater than a pre-established change threshold. In response to the visual change not being greater than the change threshold, method 900 includes presenting un-modified live video feed to the VCS on transitioning from presenting the FFV (block 910).

In response to the visual change being greater than (or at least equal to) the change threshold, method 900 includes modifying aspects of the live video to provide a modified live video that retains the at least one visual characteristic consistent with the freeze frame video (block 912). Method 900 includes presenting the modified live video to the video communication session on transition from presenting the freeze frame video to presenting the live video (block 914). Then, method ends.

In one or more embodiments, the change in the at least one visual characteristic is of the background presented within the live video, the first participant is included within a foreground image of the live video. FIG. 10 provides the features of method 1000 that handles specific ones of these conditions as well as changes to the foreground image. Following start block, method 1000 moves to block 1002 which includes identifying the current background captured within the live video and comparing visual characteristics of the current background with a FFV background being presented within the freeze frame video. Method 1000 includes determining when differences in the visual characteristics between the current background and the FFV background are greater than a pre-established difference threshold that results in visual distraction during the transition from freeze frame video to the live video (block 1004). At decision block 1006, method includes identifying whether the detected background change is greater than the pre-established difference threshold. In response to the differences being greater than the pre-established difference threshold, method 1000 includes modifying aspects of the background within the live video to provide the modified live video that maintains visual characteristics of the background consistent with the FFV background presented within the freeze frame video (block 1008).

In one or more embodiments, modifying aspects of the background of the live video image to replace the background image involves a series of processes. Method 1000 includes extracting the FFV background from the freeze frame video (block 1010). Method 1000 includes cropping a foreground video section encompassing the local participant from the background of the live video (block 1012). And, method 1000 includes integrating the foreground video segment into the FFV background to generate the modified live video (block 1014).

In one or more alternate embodiments, where the detected changes are to the background video image, the processor blurs the background image sufficiently to make the background image somewhat obscure to the other participants and/or to highlight the foreground participant as the focus of the video.

According to one or more embodiments, the change in the at least one visual characteristic is of a foreground video image of the first participant presented within the live video, the live video further includes a background within which the foreground video image is presented. Thus, as presented in FIG. 10, in response to the background change not being greater than the pre-establish different threshold, method 1000 includes detecting the change in the foreground video image and determining whether the change in the foreground video image is greater than a corresponding foreground change threshold (block 1016). In response to the change in the foreground image bring greater than the foreground image change threshold, method 1000 includes modifying the live video by replacing the foreground video image of the first participant with a next foreground image to provide the modified live video (block 1020). According to one or more embodiments, the process of modifying the live video can include cropping a FFV foreground video image from the freeze frame video and replacing the foreground video image with the FFV foreground video image to retain visual characteristics of the first participant from the FFV foreground video image within the live video.

In response to the detected change in the foreground image being less than the foreground image change threshold and/or in response to neither background or foreground image presenting a change that is greater than their respective change thresholds, method 1000 includes presenting the unmodified live video feed to the VCS (block 1020). Notably, as well, in one or more alternate embodiments, if the change is too great to provide a modified image, the AI transitions from presenting the FFV to presenting a still image or an avatar rather than presenting a live moving video that will cause or trigger a visual disruption.

According to one embodiment, the above features are provided via a computer program product comprising a non-transitory computer readable medium having program instructions that when executed by a processor of a communication device connected to a video communication session configures the communication device to perform the above-described method functions.

According to the described embodiments of the first aspect of the disclosure, a communication device, a method, and a computer program product modifies visual characteristics of live videos to enable non-disruptive transition from presenting a freeze frame video to a video communication session. While presenting the freeze frame video, the device captures live video including the participant and current background. The device detects a change in at least one visual characteristic of the live video that can present a visual distraction to other participants of the video communication session while transitioning from presenting the freeze frame video to the video communication session. In response to detecting the change: the device modifies aspects of the live video to provide a modified live video that retains the at least one visual characteristic consistent with the freeze frame video. The device presents the modified live video to the video communication session on transition from presenting the freeze frame video to presenting live video.

Figure 11:
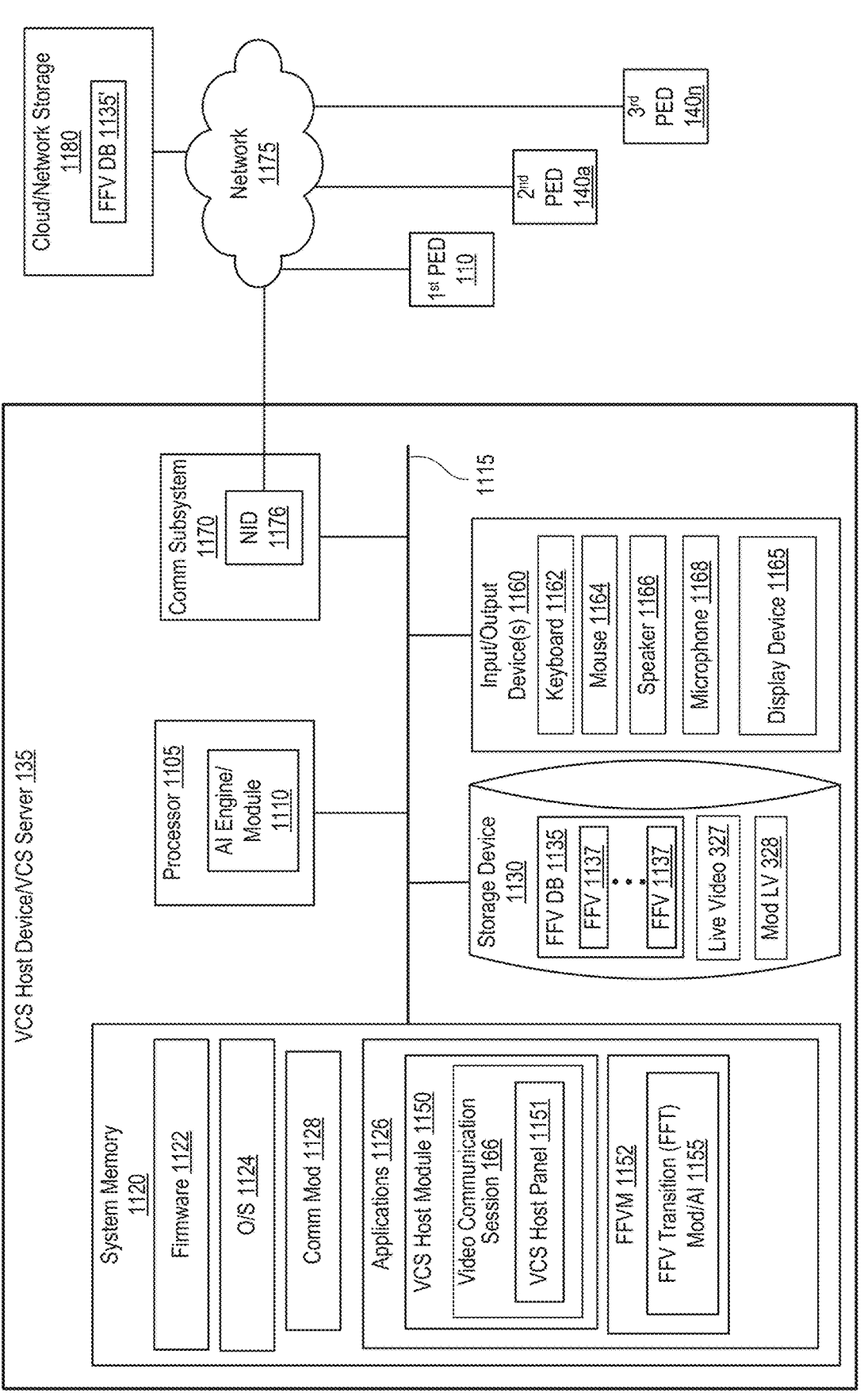
FIG. 11 presents a block diagram representation of an example data processing system than operates as a video communication session (VCS) host electronic device and which includes artificial intelligence (AI) for responding to detected changes in visual characteristics of captured live video while presenting freeze frame videos to a video communication session, according to one or more embodiments.

According to another aspect of the disclosure, the presentation of the FFV and other FFV and FFT features are provided by a data processing system (DPS) than operates as a video communication session (VCS) host device. Because of its function as a host of the video communication session, DPS is interchangeably referred to as VCS host device 135. Examples devices that operate and/or are configures as VCS host device 135 can include, but are not limited to, a desktop computer, a laptop, a distributed networked system of devices, a virtual device, a cloud computing resource, etc. FIG. 11 presents a block diagram representation of the component makeup of an example VCS host device 135, which includes artificial intelligence (AI) for responding to detected changes in visual characteristics of captured live video while presenting freeze frame videos to a video communication session hosted by the VCS host device 135, according to one or more embodiments.

VCS host device 135 is a DPS that includes processor 1105 which includes an AI engine 1110 for processing received live videos and generating modified live videos. VCS host device 135 includes system memory 1120 having stored thereon a VCS host module 1150 and a FFV module 1152 that collectively enables the electronic device 135 to operate as a video communication session host, with freeze frame video presentation capabilities. FFV module 1152 includes FFT module 1155, which provides the artificial intelligence (AI) features for generating and transmitting a modified live video 328. System memory 1120 may be a combination of volatile and non-volatile memory, such as random access memory (RAM) and read-only memory (ROM). System memory 1120 can store program instructions/code and data associated with firmware 1122, an operating system 1124, communication module 1128, and applications 1126. Communication module 1128 includes program code that is executed by processor 1105 to enable VCS host device 135 to communicate with other devices and systems. Although depicted as being separate from applications 1128, communication module 1128 may also be included within applications. Also, while shown as a separate module from VCS host module 1150, FFVM 1152 can be integrated within VCS host module 1150 as one or more sub-routines or code segments, for example. According to one or more embodiments, VCS host device 135 includes artificial intelligence (AI) 1110 for generating and/or presenting freeze frame videos to a video communication session hosted by the VCS host device 135. Processor 1105 loads and executes program code stored in system memory 1120. Examples of program code that may be loaded and executed by processor 1105 include program code associated with applications 1128 and program code associated with communication module 1126.

VCS host device 135 includes a communication subsystem 1170 that enables the device to communicatively connect, via a network 1175, with a plurality of communication devices, including a first participant communication device 110 and a plurality of second participant communication devices 140 to a video communication session 136 hosted by VCS host device 135. VCS host device 135 includes communication module (or firmware) 1126 to facilitate and/or manage communication subsystem 1170 completing connections with and communicating with external networks and devices. VCS host device 135 can be in communication, via network interface device (ND) 1176, with one or more networks, generally represented as network 1175. Network 1175 can be or can include a variety of networks such as a local area network, a wide area network, a wireless network, or the Internet.

VCS host device 135 also includes processor 1105, which is communicatively connected to the communication subsystem 1170 and the memory 1120 via a system interconnect 1115. System interconnect 1115 communicatively couples the various components and sub-components of VCS host device 135 to each other and in particular to processor 1105 and system memory 1120. The processor 1110 processes code from the VCS host module 1150 and the FFV module 1152, including the FFT module 1155, to enable the VCS host device 135 to perform a series of processes as described herein. The VCS host device 135 establishes the video communication session between the first participant communication device 110 and more than one second participant communication devices (140) among the plurality of second participant communication devices 140 via communication module 1128.

In one or more embodiments, the VCS host device 135 receives, from the first participant device 110, a first video feed including a background and a foreground image of a first participant to the video communication session 136. In response to a trigger condition, VCS host device 135 temporarily presents to the video communication session a first freeze frame video of the first participant in place of the first video feed to represent video content from the first participant device 110. The FFV can be generated by the host electronic device 135 or received from a participant communication device 110/140.

To enable and/or support some of the other functions that can be performed by VCS host device 135, VCS host device 135 includes storage device 1130, within which VCS host device 135 stores a local FFV database (DB) 1135 with FFVs 1137 for one or more of the participants that have host-controlled FFV functionality activated. In one embodiment, FFV DB 1135 is stored externally to VCS host device 135. In the illustrated embodiment, FFV DB 1135 or a network-stored copy of FFV DB 1135' is maintained at cloud/network storage 1180. Storage device 1130 also maintains a copy of captured live video 327 and modified live video 328, which is generated based on operations of FFT Module/AI 1151.

VCS host device 135 can also include one or more input/output devices 1160, enabling human interfacing with VCS host device 135. I/O devices can include keyboard 1162, mouse or pointing device 1164, speaker 1166, and microphone 1168. I/O devices can further include display device 1165, enabling graphical user interfacing with a host panel 1151 that can be generated for controlling the VCS 166.

As presented above, the VCS host device is an electronic device and incudes a communication subsystem that enables the host electronic device to communicatively connect a first communication device and at least one second communication device via a video communication session. The electronic device includes a memory having stored thereon a video communication application and a freeze frame video (FFV) module with program code for selectively presenting, during the video communication session, a freeze frame video of a first participant associated with the first communication device. The electronic device also includes at least one processor communicatively coupled to the communication subsystem and the memory. The at least one processor processes program instructions of the video communication application and the freeze frame video module to configure the host electronic device to present, via the video communication session, at least a first video comprising the first participant and to present, in response to a freeze frame video trigger associated with the first participant device, a freeze frame video comprising an image of the first participant with a first background within the freeze frame video. The electronic device also receives from the first communication device, while presenting the freeze frame video, live video of a field of view of an image capturing device of the first communication device, the live video including the first participant and a current background transmitted within the live video. The electronic device detects, based on a comparison of the live video with the freeze frame video, a change in at least one visual characteristic of the live video that can present a visual distraction to other participants of the video communication session while/when transitioning from presenting the freeze frame video to presenting the live video to the video communication session. The electronic device, in response to detecting the change, modifies aspects of the live video to provide a modified live video that retains the at least one visual characteristic consistent with the freeze frame video. The electronic device presents the modified live video to the video communication session on transition from the freeze frame video to the live video.

According to one or more embodiments, the at least one processor of the electronic device maintains a repository of buffered freeze frame videos associated with at least the first participant, selects a most recently buffered portion of a live video as the freeze frame video that is presented, and monitors the live video for changes in the at least one visual characteristic relative to the presented freeze frame video.

According to one or more embodiments, the at least one visual characteristic is of the background presented within the live video, and the local participant is included within a foreground image of the live video. The at least one processor modifies aspects of the background within the live video feed to provide the modified live video that maintains visual characteristics of the background consistent with a FFV background presented within the freeze frame video.

According to one or more embodiments, to detect the change, the at least one processor identifies the background captured within the live video and compares visual characteristics of the background with the FFV background being presented within the freeze frame video. The at least one processor then determines when differences in the visual characteristics between the background and the FFV background are greater than a pre-established difference threshold that results in the visual distraction during the transition from the freeze frame video to the live video. In response to the differences being greater than the pre-established difference threshold, the at least one processor then: extracts the FFV background from the freeze frame video; crops a foreground video section encompassing the first participant from the background of the live video; and integrates the foreground video segment into the FFV background to generate the modified live video.

According to one or more embodiments, the change in the at least one visual characteristic of the background includes an amount of ambient lighting illuminating the local participant and a background scene. The at least one processor detects a change in the amount of ambient lighting within the received live video above a respective lighting threshold change value, and the at least one processor modifies, via an image processing controller, one or more imaging criteria of the received live video to present the first participant with a similar amount of ambient lighting as within the freeze frame video.

According to one or more embodiments, the background within the freeze frame video comprises a selected first background image. The at least one processor detects a different background image within the live video from the first background image that is presented within the freeze frame video and replaces the different background image with the first background image in the modified live video that is presented to the video communication session.

According to one or more embodiments, the change in the at least one visual characteristic is of a foreground video image of the first participant presented within the live video. The live video further includes a background within which the foreground video image is presented. The at least one processor detects the change in the foreground video image, and in order to modify the live video, the processor replaces the foreground video image of the first participant in the live video with a next foreground image to provide the modified live video.

According to one or more embodiments, to replace the foreground video image the at least one processor crops a FFV foreground video image from the freeze frame video and replaces the foreground video image with the FFV foreground video image in order to retain visual characteristics of the first participant from the FFV foreground video image within the modified live video. According to an alternate embodiment, to replace the foreground video image, the at least one processor selects a still image from among one or more pre-stored images of the local participant, an avatar of the local participant, and a FFV foreground image cropped from the freeze frame video. The at least one processor replaces the foreground video image with the still image to transition from presenting a FFV foreground video image to presenting a still-image.

According to one or more embodiments, the at least one processor automates generation of the modified live video as an automatic freeze frame transition feature for freeze frame video presentation during video communication sessions. The at least one processor, in response to receiving a user setting to override the automatic freeze frame transition feature, presents the received live video without modification on transition from presenting the freeze frame video.

FIG. 12 depicts a flowchart of a method 1200 by which the VCS host device 135 generates modified live videos to prevent visual disruptions due to changes detected in the live video feed captured during presentation of a freeze frame video to a video communication session, according to one or more embodiments. The description of method 1200 presented herein are provided with general reference to the specific components illustrated within the preceding figures. Specific components referenced in method 1200 may be identical or similar to components of the same name used in describing the preceding figures. In one or more embodiments, the features of method 1200 can be provided by processor 1105 of VCS host electronic device 135 (or generally electronic device 135) operating on program instructions from the various modules and applications presented in memory 1120 of VCS host device 135. It is appreciated that certain of the described features of method 1200 may be completed by AI engine/module 1110. However, these features are all generally described as being performed by processor 1105 or host device 135 for simplicity.

Proceeding from start block, method 1200 includes presenting, by at least one processor of an electronic device 135, at least a first video comprising a first participant to a video communication session involving a first communication device 110 and at least one second communication device 140, both communicatively coupled to the electronic device 135 (block 1202). Method 1200 includes presenting, in response to a freeze frame video trigger associated with the first video, a freeze frame video including a foreground image of the first participant with a FFV background of the freeze frame video (block 1204). Method 1200 include receiving from the first communication device, while presenting the freeze frame video, live video of a field of view of an image capturing device of the first communication device, the live video including the first participant and a current background transmitted within the live video (block 1206). Method 1200 includes detecting, based on a comparison of the live video with the freeze frame video, a change in at least one visual characteristic of the live video that can present a visual distraction to other participants of the video communication session while transitioning from presenting the freeze frame video to presenting the live video to the video communication session (block 1208). Method 1200 includes determining, at decision block 1210, whether the detected change is greater than a change threshold. The change threshold can be pre-established or can be determined by the AI based on characteristics of the video communication session, such as number of participants and whether there is another participant presenting or a specific content or other participant being highlighted as the primary video focus to the VCS.

Method 1200 includes, in response to detecting the change, modifying aspects of the live video to provide a modified live video that retains the at least one visual characteristic consistent with the freeze frame video (block 1212). Method also includes presenting the modified live video to the video communication session on transition from the freeze frame video to the live video (block 1214). However, when the change is not greater than the change threshold (or in the event the feature for modifying the live video is turned off or not selected for the device for that participant), method 1200 includes presenting the received live video, without modification, to the video communication session on transition from presenting the freeze frame video (block 1216). Then, method 1000 ends, as indicated by the end block.

According to one or more embodiments, where the change in the at least one visual characteristic is of the background presented within the live video, and the first participant is included within a foreground image of the live video, method 1200 further includes modifying aspects of the background within the live video to provide the modified live video that maintains visual characteristics of the background consistent with a FFV background presented within the freeze frame video.

According to one or more embodiments, detecting the change includes: identifying the current background captured within the live video; comparing visual characteristics of the current background with a FFV background being presented within the freeze frame video; and determining when differences in the visual characteristics between the current background and the FFV background are greater than a pre-established difference threshold that results in visual distraction during the transition from the freeze frame video to the live video. Method 1200 then also includes, in response to the differences being greater than the pre-established difference threshold: extracting the FFV background from the freeze frame video; cropping a foreground video section encompassing the local participant from the background of the live video; and integrating/stitching the foreground video segment into the FFV background to generate the modified live video.

According to one or more embodiments, where the change in the at least one visual characteristic is of a foreground video image of the first participant presented within the live video, the live video includes a background within which the foreground video image is presented, the method 1200 further includes detecting the change in the foreground video image and modifying the live video by replacing the foreground video image of the first participant with a next foreground image to provide the modified live video.

According to one or more embodiments, modifying the live video further includes: cropping a FFV foreground video image from the freeze frame video; and replacing the foreground video image with the FFV foreground video image to retain visual characteristics of the first participant from the FFV foreground video image within the presented live video.

According to one or more embodiments, the features of the disclosure are provided as a computer program product that is a non-transitory computer readable medium having program instructions that when executed by a processor of a VCS host electronic device connected to and hosting a video communication session configures the electronic device to perform the various method functions described above.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
a communication subsystem that enables the electronic device to communicatively connect a first communication device and at least one second communication device via a video communication session;
a memory having stored thereon a video communication application and a freeze frame video (FFV) module with program code for selectively presenting, during the video communication session, a freeze frame video of a first participant associated with the first communication device; and
at least one processor communicatively coupled to the communication subsystem and the memory, the at least one processor processing program instructions of the video communication application and the freeze frame video module and configured to cause the electronic device to:
present, via the video communication session, at least a first video comprising the first participant;
present, in response to a freeze frame video trigger associated with the first video, a freeze frame video comprising an image of the first participant with a first background that is presented during prior recording of the freeze frame video;
receive from the first communication device, while presenting the freeze frame video, live video of a field of view of an image capturing device of the first communication device, the live video comprising the first participant and a current background transmitted within the live video;
detect, based on a comparison of the live video with the freeze frame video, a change in at least one visual characteristic of the live video that can present a visual distraction to other participants of the video communication session while transitioning from presenting the freeze frame video to presenting the live video to the video communication session; and
in response to detecting the change:

modify aspects of the live video to provide a modified live video that retains the at least one visual characteristic consistent with the freeze frame video; and
present the modified live video to the video communication session on transition from the freeze frame video to the live video.

2. The electronic device of claim 1, wherein the at least one processor is configured to cause the electronic device to:
maintain a repository of buffered freeze frame videos associated with at least the first participant;
select a most recently buffered portion of a live video as the freeze frame video that is presented; and
monitor the live video for changes in the at least one visual characteristic relative to the presented freeze frame video.

3. The electronic device of claim 1, wherein:
the at least one visual characteristic is of the background presented within the live video, the first participant being included within a foreground image of the live video; and
the at least one processor modifies aspects of the background within the live video to provide the modified live video that maintains visual characteristics of the background consistent with a FFV background presented within the freeze frame video.

4. The electronic device of claim 3, wherein to detect the change, the at least one processor:
identifies the background captured within the live video;
compares visual characteristics of the background with the FFV background being presented within the freeze frame video;
determines when differences in the visual characteristics between the background and the FFV background are greater than a pre-established difference threshold that results in the visual distraction during the transition from the freeze frame video to the live video; and
in response to the differences being greater than the pre-established difference threshold:
extract the FFV background from the freeze frame video;
crops a foreground video section encompassing the first participant from the background of the live video; and
integrates the foreground video section into the FFV background to generate the modified live video.

5. The electronic device of claim 3, wherein:
the change in the at least one visual characteristic of the background comprises an amount of ambient lighting illuminating the local participant and a background scene; and
the at least one processor is configured to cause the electronic device to:
detect a change in the amount of ambient lighting within the received live video above a respective lighting threshold change value; and
modify, via an image processing controller, one or more imaging criteria of the received live video to present the first participant with a similar amount of ambient lighting as within the freeze frame video.

6. The electronic device of claim 1, wherein:
the background within the freeze frame video comprises a selected first background image; and
the at least one processor:
detects a different background image within the live video from the first background image that is presented within the freeze frame video; and replaces the different background image with the first background image in the modified live video that is presented to the video communication session.

7. The electronic device of claim 1, wherein:

the change in the at least one visual characteristic is of a foreground video image of the first participant presented within the live video, the live video further comprising a background within which the foreground video image is presented;

the at least one processor detects the change in the foreground video image; and to modify the live video, the at least one processor replaces the foreground video image of the first participant in the live video with a next foreground image to provide the modified live video.

8. The electronic device of claim 7, wherein to replace the foreground video image the at least one processor:

crops a FFV foreground video image from the freeze frame video; and replaces the foreground video image with the FFV foreground video image to retain visual characteristics of the first participant from the FFV foreground video image within the modified live video.

9. The electronic device of claim 7, wherein to replace the foreground video image the at least one processor:

selects a still image from among one or more pre-stored images of the first participant, an avatar of the local participant, and a FFV foreground image cropped from the freeze frame video; and replaces the foreground video image with the still image to transition from presenting a FFV foreground video image to presenting a still-image freeze frame.

10. The electronic device of claim 1, wherein the at least one processor is configured to cause the electronic device to:

automates generation of the modified live video as an automatic freeze frame transition feature for freeze frame video presentation during video communication sessions; and in response to receiving a user setting to override the automatic freeze frame transition feature, presents the received live video without modification on transition from the freeze frame video.

11. A method comprising:

presenting, by at least one processor of an electronic device, at least a first video comprising a first participant to a video communication session involving a first communication device and at least one second communication device, both communicatively coupled to the electronic device;

presenting, in response to a freeze frame video trigger associated with the first video, a freeze frame video comprising an image of the first participant with a first background that is presented during prior recording of the freeze frame video;

receiving from the first communication device, while presenting the freeze frame video, live video of a field of view of an image capturing device of the first communication device, the live video comprising the first participant and a current background transmitted within the live video;

detecting, based on a comparison of the live video with the freeze frame video, a change in at least one visual characteristic of the live video that can present a visual distraction to other participants of the video communication session while transitioning from presenting the freeze frame video to presenting the live video to the video communication session; and in response to detecting the change:

modifying aspects of the live video to provide a modified live video that retains the at least one visual characteristic consistent with the freeze frame video; and presenting the modified live video to the video communication session on transition from the freeze frame video to the live video.

12. The method of claim 11, wherein:

the change in the at least one visual characteristic is of the background presented within the live video, the first participant being included within a foreground image of the live video; and the method comprises modifying aspects of the background within the live video to provide the modified live video that maintains visual characteristics of the background consistent with a FFV background presented within the freeze frame video.

13. The method of claim 12, wherein detecting the change comprises:

identifying the current background captured within the live video;

comparing visual characteristics of the current background with a FFV background being presented within the freeze frame video;

determining when differences in the visual characteristics between the current background and the FFV background are greater than a pre-established difference threshold that results in visual distraction during the transition from the freeze frame video to the live video; and in response to the differences being greater than the pre-established difference threshold:

extracting the FFV background from the freeze frame video;

cropping a foreground video section encompassing the first participant from the background of the live video; and integrating the foreground video section into the FFV background to generate the modified live video.

14. The method of claim 11, wherein:

the change in the at least one visual characteristic is of a foreground video image of the first participant presented within the live video, the live video further comprising a background within which the foreground video image is presented; and the method comprises:

detecting the change in the foreground video image; and modifying the live video by replacing the foreground video image of the first participant with a next foreground image to provide the modified live video.

15. The method of claim 14, wherein modifying the live video further comprises:

cropping a FFV foreground video image from the freeze frame video; and replacing the foreground video image with the FFV foreground video image to retain visual characteristics of the first participant from the FFV foreground video image within the live video.

16. A computer program product comprising a non-transitory computer readable medium having program instructions that when executed by a processor of an electronic device connected to a video communication session configures the electronic device to perform functions comprising:

presenting, by at least one processor of an electronic device, at least a first video comprising a first participant to a video communication session involving a first communication device and at least one second communication device, both communicatively coupled to the electronic device;

presenting, in response to a freeze frame video trigger associated with the first video, a freeze frame video comprising an image of the first participant with a first background that is presented during prior recording of the freeze frame video;

receiving from the first communication device, while presenting the freeze frame video, live video of a field of view of an image capturing device of the first communication device, the live video comprising the first participant and a current background transmitted within the live video;

detecting, based on a comparison of the live video with the freeze frame video, a change in at least one visual characteristic of the live video that can present a visual distraction to other participants of the video communication session while transitioning from presenting the freeze frame video to presenting the live video to the video communication session; and in response to detecting the change:

modifying aspects of the live video to provide a modified live video that retains the at least one visual characteristic consistent with the freeze frame video; and presenting the modified live video to the video communication session on transition from the freeze frame video to the live video.

17. The computer program product of claim 16, wherein:

the change in the at least one visual characteristic is of a real background presented within the live video, the first participant being included within a foreground image of the live video; and the program instructions comprise instructions that configure the processor to perform functions comprising modifying aspects of the background within the live video to provide the modified live video that maintains visual characteristics of the background consistent with a FFV background presented within the freeze frame video.

18. The computer program product of claim 17, wherein the program instructions for detecting the at least one change comprises instructions that configure the processor to perform functions comprising:

identifying the current background captured within the live video;

comparing visual characteristics of the current background with a FFV background being presented within the freeze frame video;

determining when differences in the visual characteristics between the current background and the FFV background are greater than a pre-established difference threshold that results in visual distraction during the transition from the freeze frame video to the live video; and in response to the differences being greater than the pre-established difference threshold:

extracting the FFV background from the freeze frame video;

cropping a foreground video section encompassing the first participant from the background of the live video; and integrating the foreground video section into the FFV background to generate the modified live video.

19. The computer program product of claim 16, wherein:

the change in the at least one visual characteristic is of a foreground video image of the first participant presented within the live video, the live video further comprising a background within which the foreground video image is presented; and the program instructions comprise instructions that configure the processor to perform functions comprising:

detecting the change in the foreground video image; and modifying the received live video by replacing the foreground video image of the first participant with a next foreground image to provide the modified live video.

20. The computer program product of claim 18, wherein the program instructions for modifying the live video further comprise instructions that configure the processor to perform functions comprising:

cropping a FFV foreground video image from the freeze frame video; and replacing the foreground video image with the FFV foreground video image to retain visual characteristics of the first participant from the FFV foreground video image within the live video.

* * * * *